United States Patent
Ma et al.

(10) Patent No.: US 9,386,235 B2
(45) Date of Patent: Jul. 5, 2016

(54) SYSTEMS AND METHODS FOR GENERATING COMPOSITE IMAGES OF LONG DOCUMENTS USING MOBILE VIDEO DATA

(71) Applicant: Kofax, Inc., Irvine, CA (US)

(72) Inventors: Jiyong Ma, San Diego, CA (US);
Anthony Macciola, Irvine, CA (US);
Jan W. Amtrup, Silver Spring, MD (US)

(73) Assignee: Kofax, Inc., Irvine, CA (US)

( * ) Notice: Subject to any disclaimer, the term of this patent is extended or adjusted under 35 U.S.C. 154(b) by 0 days.

(21) Appl. No.: 14/542,157

(22) Filed: Nov. 14, 2014

(65) Prior Publication Data

US 2015/0138399 A1 May 21, 2015

Related U.S. Application Data

(60) Provisional application No. 61/905,063, filed on Nov. 15, 2013.

(51) Int. Cl.
*H04N 5/262* (2006.01)
*H04N 5/265* (2006.01)
(Continued)

(52) U.S. Cl.
CPC ............ *H04N 5/265* (2013.01); *G06K 9/00624* (2013.01); *G06K 9/00751* (2013.01); *H04N 5/145* (2013.01)

(58) Field of Classification Search
USPC ......................................................... 348/239
See application file for complete search history.

(56) References Cited

U.S. PATENT DOCUMENTS

| 3,069,654 A | 12/1962 | Hough |
| 4,656,665 A | 4/1987 | Pennebaker |
| 4,836,026 A | 6/1989 | P'an et al. |

(Continued)

FOREIGN PATENT DOCUMENTS

| EP | 0549329 A2 | 6/1993 |
| EP | 0767578 A2 | 4/1997 |

(Continued)

OTHER PUBLICATIONS

International Search Report and Written Opinion from International Application No. PCT/US2014/065831, dated Feb. 26, 2015.

(Continued)

*Primary Examiner* — Roberto Velez
*Assistant Examiner* — Stephen Coleman
(74) *Attorney, Agent, or Firm* — Zilka-Kotab, PC

(57) ABSTRACT

Systems, methods, and computer program products are disclosed and include: initiating a capture operation using an image capture component of the mobile device, the capture operation comprising; capturing video data; and estimating a plurality of motion vectors corresponding to motion of the image capture component during the capture operation. The systems, techniques, and computer program products also include detecting a document depicted in the video data; tracking a position of the detected document throughout the video data; selecting a plurality of images using the image capture component of the mobile device, wherein the selection is based at least in part on: the tracked position of the detected document; and the estimated motion vectors; and generating a composite image based on at least some of the selected plurality of images.

21 Claims, 7 Drawing Sheets

(51) Int. Cl.
*G06K 9/00* (2006.01)
*H04N 5/14* (2006.01)

(56) References Cited

U.S. PATENT DOCUMENTS

| | | |
|---|---|---|
| 4,903,312 A | 2/1990 | Sato |
| 4,992,863 A | 2/1991 | Moriya |
| 5,020,112 A | 5/1991 | Chou |
| 5,063,604 A | 11/1991 | Weiman |
| 5,124,810 A | 6/1992 | Seto |
| 5,159,667 A | 10/1992 | Borrey et al. |
| 5,181,260 A | 1/1993 | Kurosu et al. |
| 5,202,934 A | 4/1993 | Miyakawa et al. |
| 5,220,621 A | 6/1993 | Saitoh |
| 5,268,967 A | 12/1993 | Jang et al. |
| 5,282,055 A | 1/1994 | Suzuki |
| 5,313,527 A | 5/1994 | Guberman et al. |
| 5,317,646 A | 5/1994 | Sang, Jr. et al. |
| 5,344,132 A | 9/1994 | LeBrun et al. |
| 5,353,673 A | 10/1994 | Lynch |
| 5,355,547 A | 10/1994 | Fitjer |
| 5,375,197 A | 12/1994 | Kang |
| 5,430,810 A | 7/1995 | Saeki |
| 5,467,407 A | 11/1995 | Guberman et al. |
| 5,473,742 A | 12/1995 | Polyakov et al. |
| 5,546,474 A | 8/1996 | Zuniga |
| 5,563,723 A | 10/1996 | Beaulieu et al. |
| 5,563,966 A | 10/1996 | Ise et al. |
| 5,602,964 A | 2/1997 | Barrett |
| 5,629,989 A | 5/1997 | Osada |
| 5,652,663 A | 7/1997 | Zelten |
| 5,668,890 A | 9/1997 | Winkelman |
| 5,696,611 A | 12/1997 | Nishimura et al. |
| 5,699,244 A | 12/1997 | Clark, Jr. et al. |
| 5,717,794 A | 2/1998 | Koga et al. |
| 5,721,940 A | 2/1998 | Luther et al. |
| 5,757,963 A | 5/1998 | Ozaki et al. |
| 5,781,665 A | 7/1998 | Cullen et al. |
| 5,822,454 A | 10/1998 | Rangarajan |
| 5,825,915 A | 10/1998 | Michimoto et al. |
| 5,832,138 A | 11/1998 | Nakanishi et al. |
| 5,839,019 A | 11/1998 | Ito |
| 5,848,184 A | 12/1998 | Taylor et al. |
| 5,867,264 A | 2/1999 | Hinnrichs |
| 5,937,084 A | 8/1999 | Crabtree et al. |
| 5,953,388 A | 9/1999 | Walnut et al. |
| 5,987,172 A | 11/1999 | Michael |
| 6,005,958 A | 12/1999 | Farmer et al. |
| 6,009,191 A | 12/1999 | Julier |
| 6,009,196 A | 12/1999 | Mahoney |
| 6,011,595 A | 1/2000 | Henderson et al. |
| 6,016,361 A | 1/2000 | Hongu et al. |
| 6,038,348 A | 3/2000 | Carley |
| 6,055,968 A | 5/2000 | Sasaki et al. |
| 6,067,385 A | 5/2000 | Cullen et al. |
| 6,072,916 A | 6/2000 | Suzuki |
| 6,073,148 A | 6/2000 | Rowe et al. |
| 6,098,065 A | 8/2000 | Skillen et al. |
| 6,104,830 A | 8/2000 | Schistad |
| 6,118,544 A | 9/2000 | Rao |
| 6,118,552 A | 9/2000 | Suzuki et al. |
| 6,154,217 A | 11/2000 | Aldrich |
| 6,192,360 B1 | 2/2001 | Dumais et al. |
| 6,219,158 B1 | 4/2001 | Dawe |
| 6,219,773 B1 | 4/2001 | Garibay, Jr. et al. |
| 6,223,223 B1 | 4/2001 | Kumpf et al. |
| 6,229,625 B1 | 5/2001 | Nakatsuka |
| 6,233,059 B1 | 5/2001 | Kodaira et al. |
| 6,263,122 B1 | 7/2001 | Simske et al. |
| 6,292,168 B1 | 9/2001 | Venable et al. |
| 6,327,581 B1 | 12/2001 | Platt |
| 6,337,925 B1 | 1/2002 | Cohen et al. |
| 6,347,152 B1 | 2/2002 | Shinagawa et al. |
| 6,347,162 B1 | 2/2002 | Suzuki |
| 6,356,647 B1 | 3/2002 | Bober et al. |
| 6,370,277 B1 | 4/2002 | Borrey et al. |
| 6,385,346 B1 | 5/2002 | Gillihan et al. |
| 6,393,147 B2 | 5/2002 | Danneels et al. |
| 6,408,094 B1 | 6/2002 | Mirzaoff et al. |
| 6,408,105 B1 | 6/2002 | Maruo |
| 6,424,742 B2 | 7/2002 | Yamamoto et al. |
| 6,463,430 B1 | 10/2002 | Brady et al. |
| 6,469,801 B1 | 10/2002 | Telle |
| 6,473,198 B1 | 10/2002 | Matama |
| 6,473,535 B1 | 10/2002 | Takaoka |
| 6,480,304 B1 | 11/2002 | Os et al. |
| 6,480,624 B1 | 11/2002 | Horie et al. |
| 6,501,855 B1 | 12/2002 | Zelinski |
| 6,512,848 B2 | 1/2003 | Wang et al. |
| 6,522,791 B2 | 2/2003 | Nagarajan |
| 6,525,840 B1 | 2/2003 | Haraguchi et al. |
| 6,563,531 B1 | 5/2003 | Matama |
| 6,601,026 B2 | 7/2003 | Appelt et al. |
| 6,614,930 B1 | 9/2003 | Agnihotri et al. |
| 6,621,595 B1 | 9/2003 | Fan et al. |
| 6,628,416 B1 | 9/2003 | Hsu et al. |
| 6,633,857 B1 | 10/2003 | Tipping |
| 6,643,413 B1 | 11/2003 | Shum et al. |
| 6,646,765 B1 | 11/2003 | Barker et al. |
| 6,658,147 B2 | 12/2003 | Gorbatov et al. |
| 6,665,425 B1 | 12/2003 | Sampath et al. |
| 6,667,774 B2 | 12/2003 | Berman et al. |
| 6,675,159 B1 | 1/2004 | Lin et al. |
| 6,701,009 B1 | 3/2004 | Makoto et al. |
| 6,704,441 B1 | 3/2004 | Inagaki et al. |
| 6,724,916 B1 | 4/2004 | Shyu |
| 6,732,046 B1 | 5/2004 | Joshi |
| 6,748,109 B1 | 6/2004 | Yamaguchi |
| 6,751,349 B2 | 6/2004 | Matama |
| 6,757,081 B1 | 6/2004 | Fan et al. |
| 6,757,427 B1 | 6/2004 | Hongu |
| 6,763,515 B1 | 7/2004 | Vazquez et al. |
| 6,765,685 B1 | 7/2004 | Yu |
| 6,781,375 B2 | 8/2004 | Miyazaki et al. |
| 6,788,830 B1 | 9/2004 | Morikawa |
| 6,789,069 B1 | 9/2004 | Barnhill et al. |
| 6,801,658 B2 | 10/2004 | Morita et al. |
| 6,826,311 B2 | 11/2004 | Wilt |
| 6,839,466 B2 | 1/2005 | Venable |
| 6,850,653 B2 | 2/2005 | Abe |
| 6,873,721 B1 | 3/2005 | Beyerer et al. |
| 6,882,983 B2 | 4/2005 | Furphy et al. |
| 6,898,601 B2 | 5/2005 | Amado et al. |
| 6,901,170 B1 | 5/2005 | Terada et al. |
| 6,917,438 B1 | 7/2005 | Yoda et al. |
| 6,917,709 B2 | 7/2005 | Zelinski |
| 6,921,220 B2 | 7/2005 | Aiyama |
| 6,950,555 B2 | 9/2005 | Filatov et al. |
| 6,987,534 B1 | 1/2006 | Seta |
| 6,989,914 B2 | 1/2006 | Iwaki |
| 7,016,549 B1 | 3/2006 | Utagawa |
| 7,017,108 B1 | 3/2006 | Wan |
| 7,020,320 B2 | 3/2006 | Filatov |
| 7,023,447 B2 | 4/2006 | Luo et al. |
| 7,027,181 B2 | 4/2006 | Takamori |
| 7,038,713 B1 | 5/2006 | Matama |
| 7,042,603 B2 | 5/2006 | Masao et al. |
| 7,043,080 B1 | 5/2006 | Dolan |
| 7,054,036 B2 | 5/2006 | Hirayama |
| 7,081,975 B2 | 7/2006 | Yoda et al. |
| 7,082,426 B2 | 7/2006 | Musgrove et al. |
| 7,123,387 B2 | 10/2006 | Cheng et al. |
| 7,130,471 B2 | 10/2006 | Bossut et al. |
| 7,145,699 B2 | 12/2006 | Dolan |
| 7,168,614 B2 | 1/2007 | Kotovich et al. |
| 7,173,732 B2 | 2/2007 | Matama |
| 7,174,043 B2 | 2/2007 | Lossev et al. |
| 7,177,049 B2 | 2/2007 | Karidi |
| 7,181,082 B2 | 2/2007 | Feng |
| 7,184,929 B2 | 2/2007 | Goodman |
| 7,194,471 B1 | 3/2007 | Nagatsuka et al. |
| 7,197,158 B2 | 3/2007 | Camara et al. |
| 7,201,323 B2 | 4/2007 | Kotovich et al. |
| 7,209,599 B2 | 4/2007 | Simske et al. |

(56) References Cited

U.S. PATENT DOCUMENTS

| | | |
|---|---|---|
| 7,228,314 B2 | 6/2007 | Kawamoto et al. |
| 7,249,717 B2 | 7/2007 | Kotovich et al. |
| 7,251,777 B1 | 7/2007 | Valtchev et al. |
| 7,253,836 B1 | 8/2007 | Suzuki et al. |
| 7,263,221 B1 | 8/2007 | Moriwaki |
| 7,266,768 B2 | 9/2007 | Ferlitsch et al. |
| 7,317,828 B2 | 1/2008 | Suzuki et al. |
| 7,337,389 B1 | 2/2008 | Woolf et al. |
| 7,339,585 B2 | 3/2008 | Verstraelen et al. |
| 7,340,376 B2 | 3/2008 | Goodman |
| 7,349,888 B1 | 3/2008 | Heidenreich et al. |
| 7,365,881 B2 | 4/2008 | Burns et al. |
| 7,366,705 B2 | 4/2008 | Zeng et al. |
| 7,382,921 B2 | 6/2008 | Lossev et al. |
| 7,386,527 B2 | 6/2008 | Harris et al. |
| 7,392,426 B2 | 6/2008 | Wolfe et al. |
| 7,403,008 B2 | 7/2008 | Blank et al. |
| 7,403,313 B2 | 7/2008 | Kuo |
| 7,406,183 B2 | 7/2008 | Emerson et al. |
| 7,409,092 B2 | 8/2008 | Srinivasa |
| 7,409,633 B2 | 8/2008 | Lerner et al. |
| 7,416,131 B2 | 8/2008 | Fortune et al. |
| 7,426,293 B2 | 9/2008 | Chien et al. |
| 7,430,059 B2 | 9/2008 | Rodrigues et al. |
| 7,430,066 B2 | 9/2008 | Hsu et al. |
| 7,430,310 B2 | 9/2008 | Kotovich et al. |
| 7,447,377 B2 | 11/2008 | Takahira |
| 7,464,066 B2 | 12/2008 | Zelinski et al. |
| 7,478,332 B2 | 1/2009 | Buttner et al. |
| 7,487,438 B1 | 2/2009 | Withers |
| 7,492,478 B2 | 2/2009 | Une |
| 7,492,943 B2 | 2/2009 | Li et al. |
| 7,515,313 B2 | 4/2009 | Cheng |
| 7,515,772 B2 | 4/2009 | Li et al. |
| 7,528,883 B2 | 5/2009 | Hsu |
| 7,545,529 B2 | 6/2009 | Borrey et al. |
| 7,553,095 B2 | 6/2009 | Kimura |
| 7,562,060 B2 | 7/2009 | Sindhwani et al. |
| 7,580,557 B2 | 8/2009 | Zavadsky et al. |
| 7,639,387 B2 | 12/2009 | Hull et al. |
| 7,643,665 B2 | 1/2010 | Zavadsky et al. |
| 7,651,286 B2 | 1/2010 | Tischler |
| 7,655,685 B2 | 2/2010 | McElroy et al. |
| 7,657,091 B2 | 2/2010 | Postnikov et al. |
| 7,665,061 B2 | 2/2010 | Kothari et al. |
| 7,673,799 B2 | 3/2010 | Hart et al. |
| 7,738,730 B2 | 6/2010 | Hawley |
| 7,739,127 B1 | 6/2010 | Hall |
| 7,761,391 B2 | 7/2010 | Schmidtler et al. |
| 7,778,457 B2 | 8/2010 | Nepomniachtchi et al. |
| 7,787,695 B2 | 8/2010 | Nepomniachtchi et al. |
| 7,937,345 B2 | 5/2011 | Schmidtler et al. |
| 7,949,167 B2 | 5/2011 | Krishnan et al. |
| 7,949,176 B2 | 5/2011 | Nepomniachtchi |
| 7,949,660 B2 | 5/2011 | Green et al. |
| 7,953,268 B2 | 5/2011 | Nepomniachtchi |
| 7,958,067 B2 | 6/2011 | Schmidtler et al. |
| 7,978,900 B2 | 7/2011 | Nepomniachtchi et al. |
| 7,999,961 B2 | 8/2011 | Wanda |
| 8,000,514 B2 | 8/2011 | Nepomniachtchi et al. |
| 8,064,710 B2 | 11/2011 | Mizoguchi |
| 8,073,263 B2 | 12/2011 | Hull et al. |
| 8,078,958 B2 | 12/2011 | Cottrille et al. |
| 8,094,976 B2 | 1/2012 | Berard et al. |
| 8,135,656 B2 | 3/2012 | Evanitsky |
| 8,194,965 B2 | 6/2012 | Lossev et al. |
| 8,239,335 B2 | 8/2012 | Schmidtler et al. |
| 8,244,031 B2 | 8/2012 | Cho et al. |
| 8,279,465 B2 | 10/2012 | Couchman |
| 8,311,296 B2 | 11/2012 | Filatov et al. |
| 8,326,015 B2 | 12/2012 | Nepomniachtchi |
| 8,345,981 B2 | 1/2013 | Schmidtler et al. |
| 8,354,981 B2 | 1/2013 | Kawasaki et al. |
| 8,374,977 B2 | 2/2013 | Schmidtler et al. |
| 8,379,914 B2 | 2/2013 | Nepomniachtchi et al. |
| 8,385,647 B2 | 2/2013 | Hawley et al. |
| 8,406,480 B2 | 3/2013 | Grigsby et al. |
| 8,452,098 B2 | 5/2013 | Nepomniachtchi et al. |
| 8,483,473 B2 | 7/2013 | Roach et al. |
| 8,503,797 B2 | 8/2013 | Turkelson et al. |
| 8,515,163 B2 | 8/2013 | Cho et al. |
| 8,515,208 B2 | 8/2013 | Minerich |
| 8,526,739 B2 | 9/2013 | Schmidtler et al. |
| 8,532,419 B2 | 9/2013 | Coleman |
| 8,559,766 B2 | 10/2013 | Tilt et al. |
| 8,577,118 B2 | 11/2013 | Nepomniachtchi et al. |
| 8,582,862 B2 | 11/2013 | Nepomniachtchi et al. |
| 8,620,058 B2 | 12/2013 | Nepomniachtchi et al. |
| 8,639,621 B1 | 1/2014 | Ellis et al. |
| 8,677,249 B2 | 3/2014 | Buttner et al. |
| 8,693,043 B2 | 4/2014 | Schmidtler et al. |
| 8,705,836 B2 | 4/2014 | Gorski et al. |
| 8,719,197 B2 | 5/2014 | Schmidtler et al. |
| 8,749,839 B2 | 6/2014 | Borrey et al. |
| 8,774,516 B2 | 7/2014 | Amtrup et al. |
| 8,823,991 B2 | 9/2014 | Borrey et al. |
| 8,855,375 B2 | 10/2014 | Macciola et al. |
| 8,855,425 B2 | 10/2014 | Schmidtler et al. |
| 8,885,229 B1 | 11/2014 | Amtrup et al. |
| 9,253,349 B2 | 2/2016 | Amtrup et al. |
| 2001/0027420 A1 | 10/2001 | Boublik et al. |
| 2002/0030831 A1 | 3/2002 | Kinjo |
| 2002/0054693 A1 | 5/2002 | Elmenhurst |
| 2002/0069218 A1 | 6/2002 | Sull et al. |
| 2002/0122071 A1 | 9/2002 | Camara et al. |
| 2002/0126313 A1 | 9/2002 | Namizuka |
| 2002/0165717 A1 | 11/2002 | Solmer et al. |
| 2003/0002068 A1 | 1/2003 | Constantin et al. |
| 2003/0026479 A1 | 2/2003 | Thomas et al. |
| 2003/0044012 A1 | 3/2003 | Eden |
| 2003/0046445 A1 | 3/2003 | Witt et al. |
| 2003/0101161 A1 | 5/2003 | Ferguson et al. |
| 2003/0120653 A1 | 6/2003 | Brady et al. |
| 2003/0142328 A1 | 7/2003 | McDaniel et al. |
| 2003/0156201 A1 | 8/2003 | Zhang |
| 2003/0210428 A1 | 11/2003 | Bevlin et al. |
| 2003/0223615 A1 | 12/2003 | Keaton et al. |
| 2004/0021909 A1 | 2/2004 | Kikuoka |
| 2004/0022437 A1 | 2/2004 | Beardsley |
| 2004/0083119 A1 | 4/2004 | Schunder et al. |
| 2004/0090458 A1 | 5/2004 | Yu et al. |
| 2004/0093119 A1 | 5/2004 | Gunnarsson et al. |
| 2004/0102989 A1 | 5/2004 | Jang et al. |
| 2004/0111453 A1 | 6/2004 | Harris et al. |
| 2004/0143796 A1 | 7/2004 | Lerner et al. |
| 2004/0169873 A1 | 9/2004 | Nagarajan |
| 2004/0169889 A1 | 9/2004 | Sawada |
| 2004/0175033 A1 | 9/2004 | Matama |
| 2004/0181482 A1 | 9/2004 | Yap |
| 2004/0190019 A1 | 9/2004 | Li et al. |
| 2004/0261084 A1 | 12/2004 | Rosenbloom et al. |
| 2004/0263639 A1 | 12/2004 | Sadovsky et al. |
| 2005/0021360 A1 | 1/2005 | Miller et al. |
| 2005/0030602 A1 | 2/2005 | Gregson et al. |
| 2005/0046887 A1 | 3/2005 | Shibata et al. |
| 2005/0050060 A1 | 3/2005 | Damm et al. |
| 2005/0054342 A1 | 3/2005 | Otsuka |
| 2005/0060162 A1 | 3/2005 | Mohit et al. |
| 2005/0063585 A1 | 3/2005 | Matsuura |
| 2005/0065903 A1 | 3/2005 | Zhang et al. |
| 2005/0080844 A1 | 4/2005 | Dathathraya et al. |
| 2005/0100209 A1 | 5/2005 | Lewis et al. |
| 2005/0131780 A1 | 6/2005 | Princen |
| 2005/0134935 A1 | 6/2005 | Schmidtler et al. |
| 2005/0141777 A1 | 6/2005 | Kuwata |
| 2005/0151990 A1 | 7/2005 | Ishikawa et al. |
| 2005/0160065 A1 | 7/2005 | Seeman |
| 2005/0180628 A1 | 8/2005 | Curry et al. |
| 2005/0193325 A1 | 9/2005 | Epstein |
| 2005/0204058 A1 | 9/2005 | Philbrick et al. |
| 2005/0216426 A1 | 9/2005 | Weston et al. |
| 2005/0228591 A1 | 10/2005 | Hur et al. |
| 2005/0234955 A1 | 10/2005 | Zeng et al. |
| 2005/0246262 A1 | 11/2005 | Aggarwal et al. |

(56) References Cited

U.S. PATENT DOCUMENTS

| | | |
|---|---|---|
| 2005/0265618 A1 | 12/2005 | Jebara |
| 2005/0271265 A1 | 12/2005 | Wang et al. |
| 2006/0023271 A1 | 2/2006 | Boay et al. |
| 2006/0031344 A1 | 2/2006 | Mishima et al. |
| 2006/0048046 A1 | 3/2006 | Joshi et al. |
| 2006/0074821 A1 | 4/2006 | Cristianini |
| 2006/0089907 A1 | 4/2006 | Kohlmaier et al. |
| 2006/0093208 A1 | 5/2006 | Li et al. |
| 2006/0095373 A1 | 5/2006 | Venkatasubramanian et al. |
| 2006/0095374 A1 | 5/2006 | Lo et al. |
| 2006/0098899 A1 | 5/2006 | King et al. |
| 2006/0112340 A1 | 5/2006 | Mohr et al. |
| 2006/0114488 A1 | 6/2006 | Motamed |
| 2006/0115153 A1 | 6/2006 | Bhattacharjya |
| 2006/0120609 A1 | 6/2006 | Ivanov et al. |
| 2006/0159364 A1 | 7/2006 | Poon et al. |
| 2006/0161646 A1 | 7/2006 | Chene et al. |
| 2006/0164682 A1 | 7/2006 | Lev |
| 2006/0195491 A1 | 8/2006 | Nieland et al. |
| 2006/0206628 A1 | 9/2006 | Erez |
| 2006/0212413 A1 | 9/2006 | Rujan et al. |
| 2006/0215231 A1 | 9/2006 | Borrey et al. |
| 2006/0219773 A1 | 10/2006 | Richardson |
| 2006/0222239 A1 | 10/2006 | Bargeron et al. |
| 2006/0235732 A1 | 10/2006 | Miller et al. |
| 2006/0235812 A1 | 10/2006 | Rifkin et al. |
| 2006/0236304 A1 | 10/2006 | Luo et al. |
| 2006/0242180 A1 | 10/2006 | Graf et al. |
| 2006/0256392 A1 | 11/2006 | Van Hoof et al. |
| 2006/0263134 A1 | 11/2006 | Beppu |
| 2006/0265640 A1 | 11/2006 | Albornoz et al. |
| 2006/0268356 A1 | 11/2006 | Shih et al. |
| 2006/0268369 A1 | 11/2006 | Kuo |
| 2006/0279798 A1 | 12/2006 | Rudolph et al. |
| 2006/0282442 A1 | 12/2006 | Lennon et al. |
| 2006/0282463 A1 | 12/2006 | Rudolph et al. |
| 2006/0282762 A1 | 12/2006 | Diamond et al. |
| 2006/0288015 A1 | 12/2006 | Schirripa et al. |
| 2007/0002348 A1 | 1/2007 | Hagiwara |
| 2007/0003155 A1 | 1/2007 | Miller et al. |
| 2007/0005341 A1 | 1/2007 | Burges et al. |
| 2007/0016848 A1 | 1/2007 | Rosenoff et al. |
| 2007/0030540 A1 | 2/2007 | Cheng et al. |
| 2007/0035780 A1 | 2/2007 | Kanno |
| 2007/0046957 A1 | 3/2007 | Jacobs et al. |
| 2007/0046982 A1 | 3/2007 | Hull et al. |
| 2007/0047782 A1 | 3/2007 | Hull et al. |
| 2007/0065033 A1 | 3/2007 | Hernandez et al. |
| 2007/0086667 A1 | 4/2007 | Dai et al. |
| 2007/0109590 A1 | 5/2007 | Hagiwara |
| 2007/0118794 A1 | 5/2007 | Hollander et al. |
| 2007/0128899 A1 | 6/2007 | Mayer |
| 2007/0133862 A1 | 6/2007 | Gold et al. |
| 2007/0165801 A1 | 7/2007 | Devolites et al. |
| 2007/0239642 A1 | 10/2007 | Sindhwani et al. |
| 2007/0250416 A1 | 10/2007 | Beach et al. |
| 2007/0252907 A1 | 11/2007 | Hsu |
| 2007/0260588 A1 | 11/2007 | Biazetti et al. |
| 2008/0004073 A1 | 1/2008 | John et al. |
| 2008/0005678 A1 | 1/2008 | Buttner et al. |
| 2008/0082352 A1 | 4/2008 | Schmidtler et al. |
| 2008/0086432 A1 | 4/2008 | Schmidtler et al. |
| 2008/0086433 A1 | 4/2008 | Schmidtler et al. |
| 2008/0097936 A1 | 4/2008 | Schmidtler et al. |
| 2008/0130992 A1 | 6/2008 | Fujii |
| 2008/0133388 A1 | 6/2008 | Alekseev et al. |
| 2008/0137971 A1 | 6/2008 | King et al. |
| 2008/0144881 A1 | 6/2008 | Fortune et al. |
| 2008/0147561 A1 | 6/2008 | Euchner et al. |
| 2008/0166025 A1 | 7/2008 | Thorne |
| 2008/0175476 A1 | 7/2008 | Ohk et al. |
| 2008/0177643 A1 | 7/2008 | Matthews et al. |
| 2008/0183576 A1 | 7/2008 | Kim et al. |
| 2008/0212115 A1 | 9/2008 | Konishi |
| 2008/0215489 A1 | 9/2008 | Lawson et al. |
| 2008/0219543 A1 | 9/2008 | Csulits et al. |
| 2008/0235766 A1 | 9/2008 | Wallos et al. |
| 2008/0253647 A1 | 10/2008 | Cho et al. |
| 2008/0294737 A1 | 11/2008 | Kim |
| 2009/0015687 A1 | 1/2009 | Shinkai et al. |
| 2009/0089078 A1 | 4/2009 | Bursey |
| 2009/0175537 A1 | 7/2009 | Tribelhorn et al. |
| 2009/0214112 A1 | 8/2009 | Borrey et al. |
| 2009/0228499 A1 | 9/2009 | Schmidtler et al. |
| 2010/0007751 A1 | 1/2010 | Icho et al. |
| 2010/0060910 A1 | 3/2010 | Fechter |
| 2010/0060915 A1 | 3/2010 | Suzuki et al. |
| 2010/0169250 A1 | 7/2010 | Schmidtler et al. |
| 2010/0202698 A1 | 8/2010 | Schmidtler et al. |
| 2010/0202701 A1 | 8/2010 | Basri et al. |
| 2010/0214584 A1 | 8/2010 | Takahashi |
| 2010/0232706 A1 | 9/2010 | Forutanpour |
| 2010/0280859 A1 | 11/2010 | Frederick, II |
| 2011/0013039 A1 | 1/2011 | Aisaka et al. |
| 2011/0025842 A1 | 2/2011 | King et al. |
| 2011/0116716 A1 | 5/2011 | Kwon et al. |
| 2011/0145178 A1 | 6/2011 | Schmidtler et al. |
| 2011/0196870 A1 | 8/2011 | Schmidtler et al. |
| 2011/0200107 A1 | 8/2011 | Ryu |
| 2011/0246076 A1 | 10/2011 | Su et al. |
| 2011/0249905 A1 | 10/2011 | Singh et al. |
| 2011/0285873 A1 | 11/2011 | Showering |
| 2012/0114249 A1 | 5/2012 | Conwell |
| 2012/0116957 A1 | 5/2012 | Zanzot et al. |
| 2012/0162527 A1 | 6/2012 | Baker |
| 2012/0194692 A1 | 8/2012 | Mers et al. |
| 2012/0272192 A1 | 10/2012 | Grossman et al. |
| 2012/0284122 A1 | 11/2012 | Brandis |
| 2013/0022231 A1 | 1/2013 | Nepomniachtchi et al. |
| 2013/0060596 A1 | 3/2013 | Gu et al. |
| 2013/0073459 A1 | 3/2013 | Zacarias et al. |
| 2013/0088757 A1 | 4/2013 | Schmidtler et al. |
| 2013/0090969 A1 | 4/2013 | Rivere |
| 2013/0117175 A1 | 5/2013 | Hanson |
| 2013/0121610 A1 | 5/2013 | Chen et al. |
| 2013/0124414 A1 | 5/2013 | Roach et al. |
| 2013/0152176 A1 | 6/2013 | Courtney et al. |
| 2013/0182002 A1 | 7/2013 | Macciola et al. |
| 2013/0182128 A1 | 7/2013 | Amtrup et al. |
| 2013/0182292 A1 | 7/2013 | Thrasher et al. |
| 2013/0182951 A1 | 7/2013 | Shustorovich et al. |
| 2013/0182959 A1 | 7/2013 | Thrasher et al. |
| 2013/0182970 A1 | 7/2013 | Shustorovich et al. |
| 2013/0182973 A1 | 7/2013 | Macciola et al. |
| 2013/0185618 A1 | 7/2013 | Macciola et al. |
| 2013/0230246 A1 | 9/2013 | Nuggehalli |
| 2013/0268378 A1 | 10/2013 | Yovin |
| 2013/0268430 A1 | 10/2013 | Lopez et al. |
| 2013/0287265 A1 | 10/2013 | Nepomniachtchi et al. |
| 2013/0287284 A1 | 10/2013 | Nepomniachtchi et al. |
| 2013/0297353 A1 | 11/2013 | Strange et al. |
| 2013/0308832 A1 | 11/2013 | Schmidtler et al. |
| 2014/0006129 A1 | 1/2014 | Heath |
| 2014/0006198 A1 | 1/2014 | Daly et al. |
| 2014/0012754 A1 | 1/2014 | Hanson et al. |
| 2014/0079294 A1 | 3/2014 | Amtrup et al. |
| 2014/0108456 A1 | 4/2014 | Ramachandrula et al. |
| 2014/0153787 A1 | 6/2014 | Schmidtler et al. |
| 2014/0153830 A1 | 6/2014 | Amtrup et al. |
| 2014/0164914 A1 | 6/2014 | Schmidtler et al. |
| 2014/0201612 A1 | 7/2014 | Buttner et al. |
| 2014/0207717 A1 | 7/2014 | Schmidtler et al. |
| 2014/0233068 A1 | 8/2014 | Borrey et al. |
| 2014/0254887 A1 | 9/2014 | Amtrup et al. |
| 2014/0270349 A1 | 9/2014 | Amtrup et al. |
| 2014/0270536 A1 | 9/2014 | Amtrup et al. |
| 2014/0327940 A1 | 11/2014 | Amtrup et al. |
| 2014/0368890 A1 | 12/2014 | Amtrup et al. |

FOREIGN PATENT DOCUMENTS

| | | |
|---|---|---|
| EP | 0936804 A2 | 8/1999 |
| EP | 1128659 A1 | 8/2001 |
| EP | 1317133 A1 | 6/2003 |

(56) References Cited

FOREIGN PATENT DOCUMENTS

| | | |
|---|---|---|
| EP | 1422920 A2 | 5/2004 |
| EP | 1956518 A1 | 8/2008 |
| EP | 1959363 A2 | 8/2008 |
| EP | 1976259 A1 | 10/2008 |
| JP | H0962826 A | 3/1997 |
| JP | H09116720 A | 5/1997 |
| JP | 2000067065 A | 3/2000 |
| JP | 2000103628 A | 4/2000 |
| JP | 2000354144 A | 12/2000 |
| JP | 2001309128 A | 11/2001 |
| JP | 2002024258 A | 1/2002 |
| JP | 2002519766 A | 7/2002 |
| JP | 2002312385 A | 10/2002 |
| JP | 2003091521 A | 3/2003 |
| JP | 2003196357 A | 7/2003 |
| JP | 2003234888 A | 8/2003 |
| JP | 2003303315 A | 10/2003 |
| JP | 2005018678 A | 1/2005 |
| JP | 2005173730 A | 6/2005 |
| JP | 2006209588 A | 8/2006 |
| JP | 2008134683 A | 6/2008 |
| TW | 401553 B | 8/2000 |
| WO | 9604749 A1 | 2/1996 |
| WO | 9847098 A1 | 10/1998 |
| WO | 9967731 A1 | 12/1999 |
| WO | 02063812 A2 | 8/2002 |
| WO | 2004053630 A2 | 6/2004 |
| WO | 2006104627 A1 | 10/2006 |
| WO | 2008008142 A2 | 1/2008 |
| WO | 2010030056 A1 | 3/2010 |

OTHER PUBLICATIONS

U.S. Appl. No. 61/780,747, filed Mar. 13, 2013.
U.S. Appl. No. 61/819,463, filed May 3, 2013.
Notice of Allowance from U.S. Appl. No. 14/268,876, dated Aug. 29, 2014.
Non-Final Office Action from U.S Appl. No. 14/268,876, dated Jul. 24, 2014.
Non-Final Office Action from U.S Appl. No. 14/473,950, dated Jan. 21, 2015.
Non-Final Office Action from U.S Appl. No. 14/473,950, dated Feb. 6, 2015.
Final Office Action from U.S. Appl. No. 14/473,950, dated Jun. 26, 2015.
Notice of Allowance from U.S. Appl. No. 14/473,950, dated Sep. 16, 2015.

SYSTEMS AND METHODS FOR GENERATING COMPOSITE IMAGES OF LONG DOCUMENTS USING MOBILE VIDEO DATA

PRIORITY CLAIM

This application claims priority to U.S. Provisional Patent Application No. 61/905,063, filed Nov. 15, 2013 and entitled "SYSTEMS AND METHODS FOR DETECTING AND CLASSIFYING OBJECTS IN VIDEO CAPTURED USING MOBILE DEVICES," which is herein incorporated by reference in its Entirety.

RELATED APPLICATIONS

This application is related to copending U.S. patent application Ser. Nos. 13/740,123, filed Jan. 11, 2013; 13/802,226, filed Mar. 13, 2013 and Provisional U.S. Patent Application Nos. 61/780,747, filed Mar. 13, 2013, and 61/819,463, filed May 3, 2013, each of which is also herein incorporated by reference in its entirety.

FIELD OF INVENTION

The present invention relates to digital video capture and digital video data processing, more particularly to capturing and processing digital video data using a mobile device, and even more particularly to capturing video data, each frame of which depicts at least a portion of a "long" document and processing the captured video data to generate a single composite image depicting the entire "long" document.

BACKGROUND OF THE INVENTION

Modern mobile devices are well adapted to capturing images of a variety of objects, including documents, persons, automobiles, etc. Improvements to the mobile device image capture component capabilities and/or processing power make applications for capturing and/or processing digital image data using a mobile device increasingly attractive in an increasingly mobile-device-driven economy.

However, limitations of the mobile device hardware and practical limitations of capturing images using a mobile device present major challenges to efficient and effective digital image processing. For example, in line with the widespread adoption of electronic documents as a preferred medium of information transfer in many business contexts, along with the advent of mobile technology as a competent means of capturing high quality image data, many businesses have turned to a mobile-device oriented document capture and processing approach. In particular contexts, certain documents may be too large to capture in a single image having sufficient resolution to accomplish the necessary processing for downstream purposes.

Using traditional image capture and processing algorithms, especially those configured for use with a mobile device serving as the capture device, this has prevented implementation of the very useful techniques in contexts that would otherwise benefit greatly from a more modern, automated approach.

Accordingly, it would be beneficial to provide systems, methods, and/or computer program products capable of capturing and/or processing image data in a manner that overcomes the challenges presented above and improve users' ability to capture and process data represented on "long" documents, especially using mobile devices.

SUMMARY OF THE INVENTION

System and methods for long document stitching with images captured by mobile devices are disclosed.

In one approach, a method includes initiating a capture operation using an image capture component of the mobile device, the capture operation comprising; capturing video data; and estimating a plurality of motion vectors corresponding to motion of the image capture component during the capture operation; detecting a document depicted in the video data; tracking a position of the detected document throughout the video data; selecting a plurality of images using the image capture component of the mobile device, wherein the selection is based at least in part on: the tracked position of the detected document; and the estimated motion vectors; and generating a composite image based on at least some of the selected plurality of images.

In another embodiment, a system includes a mobile device configured to execute logic, the logic being configured to cause the mobile device, upon execution thereof, to: initiate a capture operation using an image capture component of the mobile device, the capture operation comprising; capturing video data; and estimating a plurality of motion vectors corresponding to motion of the image capture component during the capture operation; detect a document depicted in the video data; track a position of the detected document throughout the video data; select a plurality of images using the image capture component of the mobile device, wherein the selection is based at least in part on: the tracked position of the detected document; and the estimated motion vectors; and generate a composite image based on at least some of the selected plurality of images.

In yet another embodiment, a computer program product includes a computer readable medium having stored thereon instructions executable by a mobile device, the instructions being configured to cause the mobile device, upon execution thereof, to: initiate a capture operation using an image capture component of the mobile device, the capture operation comprising; capturing video data; and estimating a plurality of motion vectors corresponding to motion of the image capture component during the capture operation; detect a document depicted in the video data; track a position of the detected document throughout the video data; select a plurality of images using the image capture component of the mobile device, wherein the selection is based at least in part on: the tracked position of the detected document; and the estimated motion vectors; and generate a composite image based on at least some of the selected plurality of images.

Of course, the foregoing summary is to be understood as a mere example of the presently disclosed inventive concepts and embodiments, and should not be considered limiting on the scope of the present descriptions in any manner.

DETAILED DESCRIPTION

Figure 1:
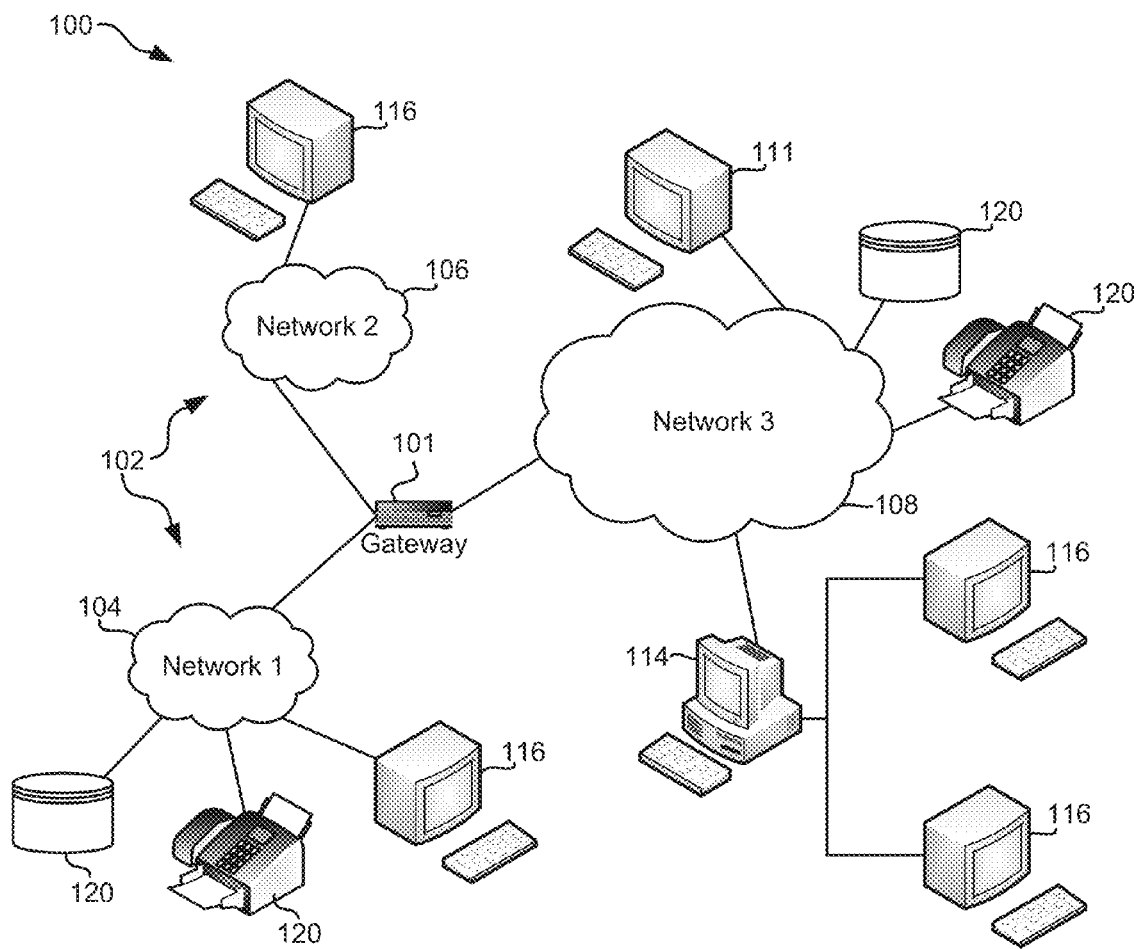
FIG. 1 depicts a simplified schematic of a network computing environment, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The present application refers to image processing.

Images (e.g. pictures, figures, graphical schematics, single frames of movies, videos, films, clips, etc.) are preferably digital images captured by image capture components, especially image capture components of mobile devices. As understood herein, a mobile device is any device capable of receiving data, without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

However, as it will become apparent from the descriptions of various functionalities, the presently disclosed mobile image processing algorithms can be applied, sometimes with certain modifications, to images coming from scanners and multifunction peripherals (MFPs). Similarly, images processed using the presently disclosed processing algorithms may be further processed using conventional scanner processing algorithms, in some approaches.

Of course, the various embodiments set forth herein may be implemented utilizing hardware, software, or any desired combination thereof. For that matter, any type of logic may be utilized which is capable of implementing the various functionality set forth herein.

One benefit of using a mobile device is that with a data plan, image processing and information processing based on captured images can be done in a much more convenient, streamlined and integrated way than previous methods that relied on presence of a scanner. However, the use of mobile devices as document(s) capture and/or processing devices has heretofore been considered unfeasible for a variety of reasons.

In one approach, an image may be captured by an image capture component of a mobile device. The term "image capture component" should be broadly interpreted to include any type of device capable of capturing an image of a physical object external to the device, such as a piece of paper. The term "image capture component" does not encompass a peripheral scanner or multifunction device. Any type of image capture component may be used. Preferred embodiments may use image capture components having a higher resolution, e.g. 8 MP or more, ideally 12 MP or more. The image may be captured in color, grayscale, black and white, or with any other known optical effect. The term "image" as referred to herein is meant to encompass any type of data corresponding to the output of the image capture component, including raw data, processed data, etc.

As recited herein, the term "long document" should be understood to include any type of document incapable of being captured in a single still image with sufficient resolution to accomplish downstream processing of the document and/or document contents, e.g. sufficient resolution to discern the position and identity of individual characters, sufficient resolution to discern the position and identity of document features such as lines, images, reference objects such as barcodes or registration marks (e.g. substantially representing a "+" symbol), and/or sufficient resolution to distinguish the document itself from background textures also depicted in the image data depicting the document. In preferred approaches, "sufficient resolution" is to be understood as a resolution no less than a resolution corresponding to about 200 dots per inch (DPI) or 200 pixels per inch (PPI).

As discussed in greater detail below, exemplary forms of "long document" may be understood to include receipts, legal documents (e.g. a document size of approximately 8.5 inches wide by 14 inches long), promissory notes, mortgage documents, titles, deeds, posters, banners, prints, forms, envelopes, etc., as would be understood by one having ordinary skill in the art upon reading the present descriptions.

Put another way, in various embodiments a document may be considered "long" whenever the document exceeds a length of about 11 inches along a longest dimension thereof, and/or whenever the document exhibits an aspect ratio of at least about 2.5:1.

In embodiments where a document being imaged is "long" it may be particularly advantageous to orient the image capture component and the wide document so that longitudinal axes thereof are perpendicular during the capture operation. This increases the effective resolution of the images captured, as more of the document may be contained within the viewfinder at a given distance from the document than when the longitudinal axes of the document and the camera are aligned in parallel.

In addition, as referred to herein the term "textual information" should be understood to include any and all types of information that may be contained in, represented by, or derived from, text. For example, textual information may be understood to include the position of text on a document, the identity of one or more characters (e.g. letters, numbers, symbols, etc.) depicted on the document, an identity of a series of characters (i.e. a "string" of text) depicted on the document, a partial or complete shape of one or more characters depicted on the document, a size of one or more characters (absolute or relative, in varied approaches), a color of one or more characters, a font type corresponding to one or more characters, etc. as would be understood by a person having ordinary skill in the art upon reading the present descriptions.

As to be distinguished from the character identity, in preferred approaches character shape refers to the appearance of markings present on the document, without necessarily including the entire marking or, in the case where the marking corresponds to a character, without necessarily including the identity of the character represented by the marking.

As recited herein, the term "document features" should be understood to include any and all types of identifying characteristic of a document other than "textual information." For example, in various approaches document features may include a size or shape of the document itself. Document features may also include presence, absence, size, shape and/or position of any number of markings represented on the document, such as lines, images, logos, signatures, holograms, watermarks, etc. as would be understood by one having ordinary skill in the art upon reading the present descriptions. Document features may further include color information corresponding to part or all of a document, e.g. a color of the document background, a color distribution corresponding to a region of interest within the document (such as a region depicting an image, logo, hologram, signature, etc.), and/or a determination of whether or not a document depicts color information at all.

In one approach, an image capture component motion tracker is applied to track the image capture component motion relative to a long document being imaged. In order to speed up the tracking process and reduce the power consumption of smartphones, a fast and efficient image capture component tracking algorithm is applied. In the image capture component tracking algorithm, the resolution of an original captured image is reduced, and pixels in the low resolution image are downsampled. A direct image matching of those sampled pixels between a reference frame and a test frame is applied. A best matching is found as the one with minimum matching error.

For embodiments operating on a sequence of frames in a video, the accumulated image capture component motion trajectory is estimated. When the accumulated image capture component motion displacement reaches a pre-defined threshold, a picture is taken. The captured picture is either from in a video recording mode or in a picture mode. The tracking system may notify users that the image capture component should not be moved during the picture is taken to avoid image blur.

For example, in several approaches concerning a long document, a sequence of pictures are taken, each of them is a partial image of the long document. The tracked overlap regions between the captured adjacent pictures provide the constraints to reduce the ambiguity in detailed-overlap matching or text block matching afterwards. For the detailed-overlap matching, textual information, including but not limited to: character shape, character position, character identity, character size, character color, character font, etc. are applied to recognize the text in the overlap regions of images.

The detailed-overlap matching can be based on a text block matching technique. In order to do the text block matching, a robust text line detector is applied to the recognized characters with their associated bounding boxes. The robust text line detector clusters the recognized characters based on their locations and group them in different text lines. After text line detection, a text block matching algorithm is applied to find the best text line match. The text block matching algorithm searches the best matched text line by comparing the correlation between two text blocks with different alignment hypotheses. After the best text line is found, the transform matrix from a successive image to the present image is estimated with the two text line bounding boxes. The successive image is mapped to the present image plane, and an image warping and blending procedure is applied.

In this way, a single, composite long document image is generated having sufficient resolution to enable downstream processing of the long document in many useful contexts and applications.

For example, in one general embodiment, a method includes initiating a capture operation using an image capture component of the mobile device, the capture operation comprising; capturing video data; and estimating a plurality of motion vectors corresponding to motion of the image capture component during the capture operation; detecting a document depicted in the video data; tracking a position of the detected document throughout the video data; selecting a plurality of images using the image capture component of the mobile device, wherein the selection is based at least in part on: the tracked position of the detected document; and the estimated motion vectors; and generating a composite image based on at least some of the selected plurality of images.

In another general embodiment, a system includes a mobile device configured to execute logic, the logic being configured to cause the mobile device, upon execution thereof, to: initiate a capture operation using an image capture component of the mobile device, the capture operation comprising; capturing video data; and estimating a plurality of motion vectors corresponding to motion of the image capture component during the capture operation; detect a document depicted in the video data; track a position of the detected document throughout the video data; select a plurality of images using the image capture component of the mobile device, wherein the selection is based at least in part on: the tracked position of the detected document; and the estimated motion vectors; and generate a composite image based on at. least some of the selected plurality of images.

In still yet another general embodiment, a computer program product includes a computer readable medium having stored thereon instructions executable by a mobile device, the instructions being configured to cause the mobile device, upon execution thereof, to: initiate a capture operation using an image capture component of the mobile device, the capture operation comprising; capturing video data; and estimating a plurality of motion vectors corresponding to motion of the image capture component during the capture operation; detect a document depicted in the video data; track a position of the detected document throughout the video data; select a plurality of images using the image capture component of the mobile device, wherein the selection is based at least in part on: the tracked position of the detected document; and the estimated motion vectors; and generate a composite image based on at least some of the selected plurality of images.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 198, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104,106,108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
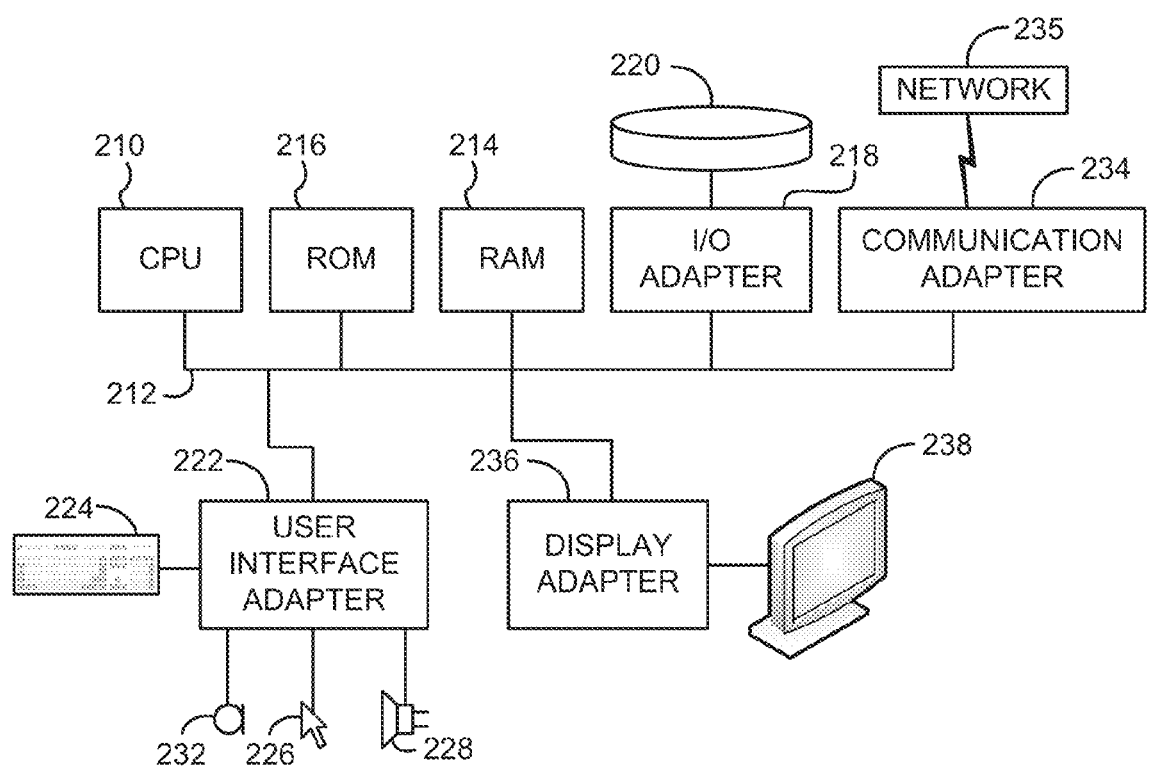
FIG. 2 depicts a schematic of a computer workstation in communication with a network, according to one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a image capture component (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

An application may be installed on the mobile device, e.g., stored in a nonvolatile memory of the device. In one approach, the application includes instructions to perform processing of an image on the mobile device. In another approach, the application includes instructions to send the image to a remote server such as a network server. In yet another approach, the application may include instructions to decide whether to perform some or all processing on the mobile device and/or send the image to the remote site.

In various embodiments, the presently disclosed methods, systems and/or computer program products may utilize and/or include any of the functionalities disclosed in related U.S. patent application Ser. No. 13/740,123, filed Jan. 11, 2013. For example, digital images suitable for processing in whole or in part using the presently disclosed methodologies, systems, etc. may be subjected to any image processing operations disclosed in the aforementioned Patent Application, such as page detection, rectangularization, detection of uneven illumination, illumination normalization, resolution estimation, blur detection, etc.

In various embodiments, the presently disclosed methods, systems and/or computer program products may utilize and/or include any of the functionalities disclosed in related U.S. patent application Ser. No. 13/802,226, filed Mar. 13, 2013 and Provisional U.S. Patent Application Ser. No. 61/780,747, filed Mar. 13, 2013. For example, digital images suitable for processing in whole or in part using the presently disclosed methodologies, systems, etc. may be subjected to any classification and/or data extraction operations disclosed in the aforementioned Patent Applications, including for instance classifying objects depicted in a digital image according to type based at least in part on characteristics of the object, performing custom-tailored image processing using information about the object characteristics and/or object class, building and/or using feature vectors to perform classification, building and/or using feature vectors to develop a data extraction model for the object and/or object class(es), using data extraction models to extract data from digital images, etc.

Long Document Capture

Figure 3:
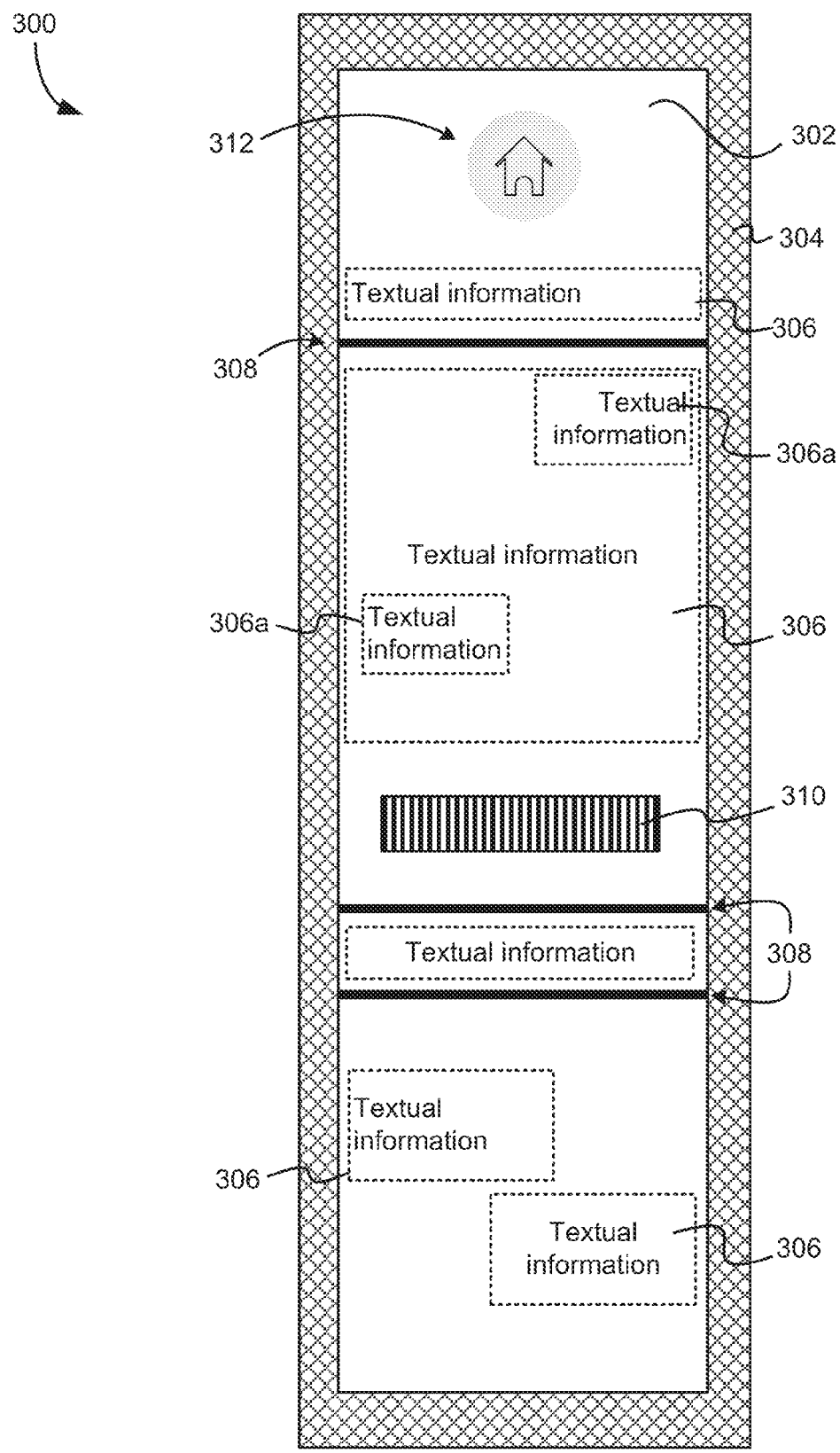
FIG. 3 depicts an exemplary schematic of a long document, according to one embodiment.

FIG. 3 depicts a schematic of an exemplary "long document" image 300 according to one embodiment. The long document image 300 substantially represents a receipt, but one having ordinary skill in the art will appreciate that the long document may include any number or type of "long documents" as defined herein and further as would be understood upon reading the present descriptions. The image 300 as shown in FIG. 3 conspicuously includes an image background 304 and an image foreground 302. The image foreground 302 preferably corresponds to the long document.

As further shown in FIG. 3, the long document includes a plurality of features such as textual information 306, 306a, a plurality of borders or separating lines 308, a reference object such as a barcode 310, and an image or logo 312. The features may be arranged in any manner throughout the document, and may even exhibit partial or complete overlap, e.g. as demonstrated by overlapping textual information 306 and 306a, in some embodiments.

Figure 4:
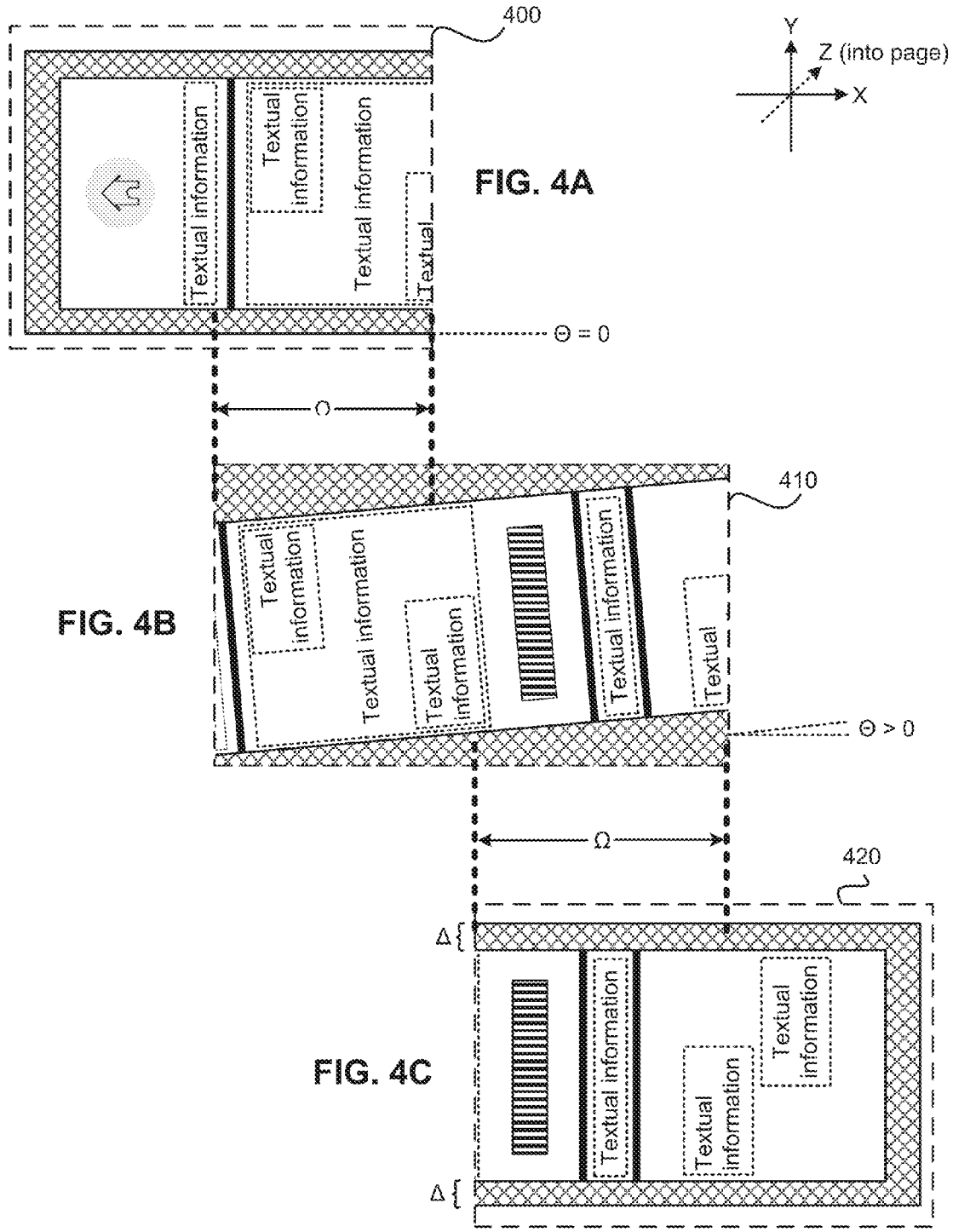
FIGS. 4A-4C depict portions of the long document depicted in FIG. 3 at various stages in a long document capture and processing algorithm, according to several embodiments.

FIGS. 4A-4C depict several embodiments of a long document capture process at various stages of completion, as disclosed herein. Each of FIGS. 4A-4C correspond to a selectively captured image 400, 410, 420 (respectively) that will be utilized to generate a composite single image depicting the entire document (e.g. as shown in FIG. 3).

In one exemplary embodiment, "automatic long document stitching" refers to an automatic process that can stitch partially overlapped document images captured from a camera in a video or in separate pictures. For instance, a commonly used camera in mobile devices (e.g. a camera having a resolution of about eight megapixels) may not have enough high resolution to capture a long receipt in a single picture. In order to get a sufficiently high resolution image of the long receipt with the same device, several partially overlapped images of the long receipt may be captured and stitched together. In FIGS. 4A-4C, three images with overlaps are captured, which may be stitched together as one image, substantially representing the long document as shown in FIG. 3.

In more approaches, the automatic long document stitching problem is similar to panoramic image stitching. The main difference between these two problems is that, for long document stitching, the camera may be close to the document, as a result, a little movement of the camera can cause image blur. Therefore, long document stitching is more challenging. Some techniques developed for panoramic image stitching may be applied to long document stitching. However, there exists artifact at the seams of the stitching document. Because of the limited processing power of mobile devices, applying these techniques directly to long document stitching requires use of additional processing resources such as one or more GPU accelerators and/or multi-core CPU support. Considering the hardware limitations of mobile devices, and provide an efficient approach to long document stitching. The approach involves document tracking, text block matching, and image composition, as discussed further below.

With specific respect to document capture, in a preferred embodiment a user puts a long document on a desk with a flat surface, and initiates a capture operation, e.g. within a mobile application. The user continuously moves the mobile device in a preferably straight along the longitudinal axis of the document as shown in FIG. 3. The motion should be as straight as possible to avoid situations where the document is out of camera view.

The user also preferably keeps the vertical distance between the camera and document substantially constant to avoid changes in apparent document size between the captured images.

Moreover, the speed of camera movement is preferably kept as substantially constant to make document tracking possible (i.e., within the limitations of the mobile device hardware). In some approaches, constancy of motion may be monitored and the capture operation may be terminated or paused if motion deviates from desired parameters, e.g. as may be accomplished using a motion displacement threshold, described above. As will be understood by skilled artisans upon reading the present descriptions, the amount of motion displacement tolerable in a particular context may be partially dependent on factors such as camera resolution, shutter speed, etc.

Similarly, vertical camera movement may be detected and restricted based on information obtained from additional mobile device components, such as an accelerometer. Since the size of the long document is not necessarily known a priori, it is not desirable to utilize image data to track vertical motion. Instead, it is advantageous to query a device accelerometer and in response to determining the device has moved a predetermined amount in a predefined (e.g. vertical) direction over a predefined span of time (e.g. one centimeter over a span of one second), the capture operation may be terminated or paused.

The above references to terminating or pausing the capture operation should be understood as quality control measures, rather than as criteria causing abandonment of the presently disclosed long document stitching techniques. Subsequent to termination or pausing of the capture operation, in preferred embodiments a new (or the same) capture operation is initiated (resumed) to complete the requisite capture operation for subsequent processing and stitching.

With respect to tracking and document detection, in preferred approaches the primary aim of camera motion tracking is to track the motion of camera relative to the document in a video. Using camera motion information, it is advantageous to estimate how the overlap between two adjacent captured images.

Various motion tracking and image registration techniques can be applied. For example, the tracking approaches can be pixel-based or feature-based. In a preferred approach a direct pixel-image approach is applied to camera motion tracking. At high capturing rates, e.g. greater than 24 frames/second in one embodiment, greater than 30 frames/sec in another embodiment, and greater than 59 frames/sec in yet another embodiment. It is preferable to ignore the camera movement in space rotations, and vertical motions (i.e. camera motions that will cause the change of the distance between camera and the document). Instead, it is preferred to only track two dimensional displacement motions, i.e., left and right motions and up/down motions along the document's longitudinal axis (as shown in FIG. 3 and FIGS. 4A-4C).

The camera motion tracking module is preferably used to determine when a picture of the document should be taken, and whether the picture should be captured automatically or manually. For instance, in one approach the first frame of the document is captured when a document detection module once detects there exists a document in the picture. For the following frames of the document image, when an image of the document should be taken is preferably determined by the specified overlap length between two adjacent frames of documents as shown in FIGS. 4A-4C. The specified overlaps between two adjacent frames of images (represented in FIGS. 4A-4C as $\Omega$), can be converted to a number of pixels. If the accumulated camera motion/displacement is close to the specified value (also referred to herein as an "overlap threshold"), the system preferably captures an image of the document.

In additional and/or alternative approaches, the presently disclosed document tracking techniques include: downsampling captured image data to reduce the original image resolution; sampling image pixels in the downsampled image; and estimating motion vectors.

For example, in one embodiment estimating motion vectors may include a scenario where two adjacent frames of images are captured, and the first frame is defined as a reference frame, while the second frame is designated as a test frame. The residual errors between intensity of pixels in the test frame and the reference frame are computed for different hypotheses of the actual motion vectors. The best motion vector hypothesis is chosen as the one with minimum of residual errors. Preferably, the residual errors are the accumulated intensity errors of all pixels between reference frame and test frame. In one exemplary approach, assume there are ten hypotheses of motion vectors, $(x1,y1), (x2,y2), \ldots (x10, y10)$. The document tracking techniques may compare the image intensities of those ten pixels (e.g. in the test frame) with that a reference pixel (e.g. in the reference frame. The pixel with minimum matching error would be the best matching.

Document tracking also include generating edge masks; pixels near the four edges of the reference frame may be out of camera view in the test frame; and a mask may be generated for those pixels so that they are excluded in image matching. As shown in FIG. 4C, the edge mask(s) may be generated so as to have a width $\Delta$, where $\Delta$ is preferably a value in a range from about 5% to about 10% of a total document length as detected at the beginning of the tracking process.

The motion vector estimation and edge masking may be repeated iteratively until the entire document is captured and processed.

When the accumulated camera motion displacement has reached the pre-defined threshold, the tracking system will automatically capture an image of the partial document, and/or notify the user that a picture of the partial document will be taken. For instance, in FIG. 4B, the image is taken when the camera motion tracking system has detected that the overlap between the first picture shown in the first row and the second picture to be taken approximately equals a pre-defined overlap threshold value (e.g. 40%).

For FIG. 4C, and as a general concern for the "last" partial image in any sequence of images captured in the course of the presently disclosed techniques, the overlap between the second image and itself may not necessarily equal to the pre-defined value, accordingly the image is taken once the right part of the document is in the camera view.

In a preferred approach, the three images are taken as shown in FIGS. 4A-4C. The first one (FIG. 4A) is taken once the system has detected there is a document and its top side is in the camera view (shown at left, in FIG. 4A). The second image (FIG. 4B) is taken when the camera tracking system has detected the camera displacement has just reached the pre-defined threshold value. The third image (FIG. 4C) is taken when the bottom part of the document is in the camera view (shown at right).

Referring now to text block matching, preferred embodiments of the capture and tracking techniques described above generate a sequence of partially overlapped images of the long document. These images have overlaps between two adjacent frames. The lengths of the overlaps are estimated by the camera motion tracking system. These overlap lengths are not necessarily equal to, but are representative of, the exact overlap length between two adjacent frames of images. In other words, the overlap length provides constraints to find the detailed match between the two adjacent frames of images afterwards. These constraints reduce the ambiguity in finding the detailed match.

Most preferably, however, textual information such as the characters in the document can be used to find the detailed match.

In other embodiments, optical character recognition (OCR) can be applied. For example, an OCR module will recognize the position and identity of characters depicted in textual information throughout the various images. Bar codes, reference objects, logos, pictures, etc. may be in these images, but are preferably ignored.

In one embodiment, an OCR module is utilized to process the input image. The output image may be different from the input image because a de-skew process may be applied to the input image, to generate a de-skewed image as output. The OCR module also recognizes the input image and outputs the textual information of the recognized characters and their associated bounding boxes.

In additional embodiments, in order to find text "lines" from the recognized characters and their associated bounding boxes, it is advantageous to apply a robust text line finding algorithm for them. The robust text line algorithm may employ clustering techniques using the character bounding boxes as input. This algorithm will group characters within one line as a text line, e.g. by locating adjacent pairs of characters, then locating adjacent pairs of character pairs to form character triplets, then locating adjacent character triplets to form adjacent character quadruplets, etc. etc. as would be understood by a skilled artisan upon reading the present descriptions. Subsequently, text lines in the pre-defined region of an image are preferably organized as a text block, which may be used as the basic unit of comparison for text block matching, as described herein The text block matching approach, in one embodiment, is as follows: for two text blocks in the overlap regions of two adjacent images compute a correlation between at least two text blocks; find the best matching alignment hypothesis based on the correlation; generate, for the particular alignment hypothesis, a text block matching score based on a number of characters in the two text blocks that match (e.g. exhibit substantially same character identity and character position); and sum the text block matching scores to generate a text line matching score.

Referring now to image composition and stitching, also known as "generating a composite image," in various embodiments the presently disclosed inventive concepts include some or all of the following features.

In one embodiment, and based on the results of the text block matching described above, bounding boxes of the text lines in the best match are used to estimate an affine or homograph transform matrix, also referred to herein as a "first transformation matrix." The first transform matrix is applied to every pixel in the second image (test frame) to transform the second image to coordinate system in the first image (reference frame). In this way, the second image is adjusted to the first image plane, and a composite image including information depicted in both the two images is derived.

In more embodiments, e.g. for a third image which has overlap with the second image, the same procedure mentioned for the first two images is applied to get the second transform matrix to map the third image to the second image plane. The first transform matrix multiplied by the second transform matrix is the accumulated transform matrix which maps the third image to the first image plane. In this way, for any number of images to be composed, the accumulated transform matrices can be derived, and applied to the images.

Figure 5:
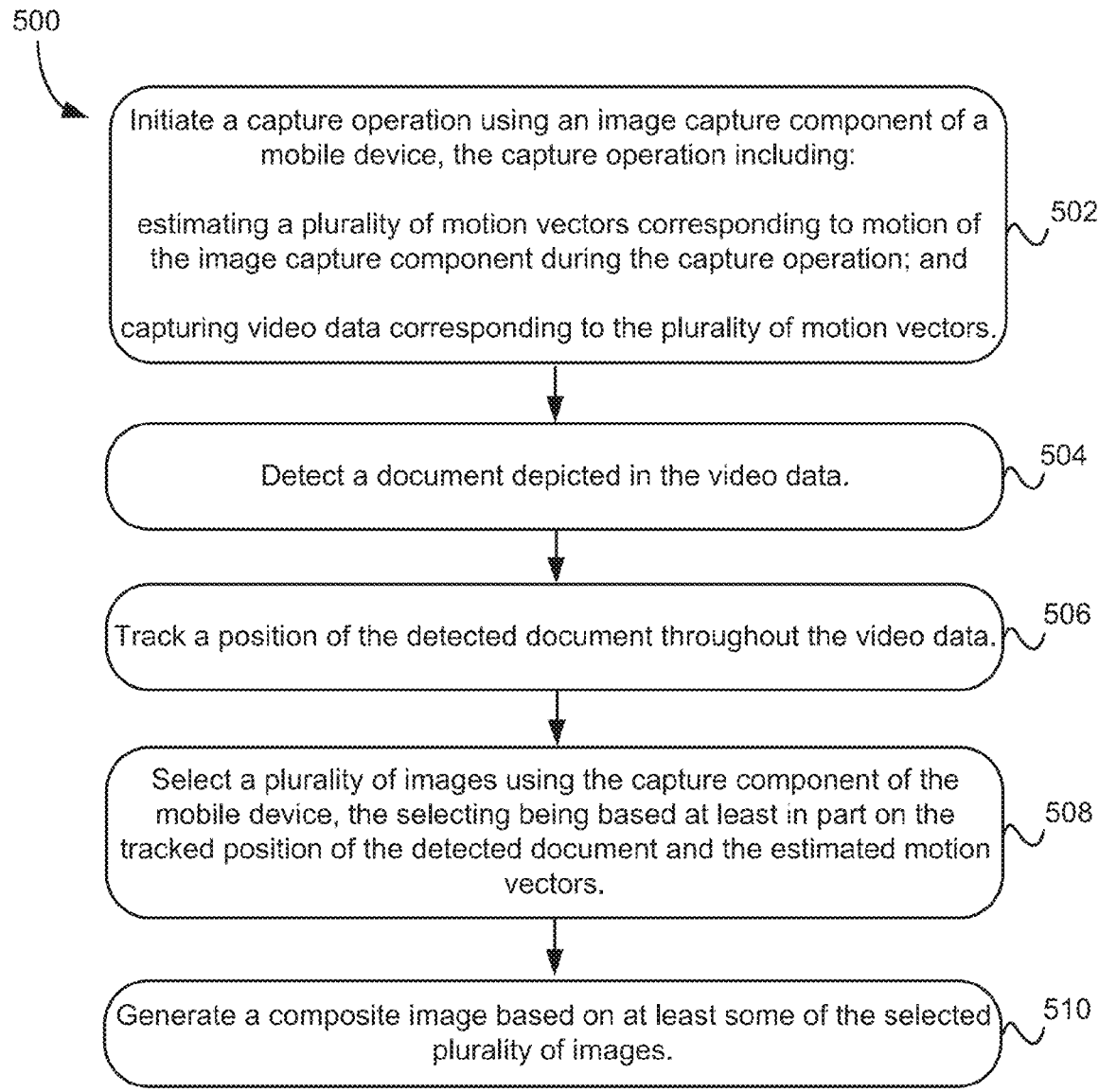
FIG. 5 is a flowchart of a method, according to one embodiment.

FIG. 5 depicts an exemplary flowchart of a method 500 for accomplishing long document capture, according to one embodiment of the present disclosures. As would be understood by one having ordinary skill in the art reading these descriptions, the method 500 may be performed in any environment, including those depicted in FIGS. 1-4C, in various embodiments.

As shown in FIG. 5, method 500 includes operation 502, where a capture operation is initiated using a capture component of a mobile device. The capture operation preferably includes capturing video data, and estimating a plurality of motion vectors corresponding to motion of the image capture component during the capture operation.

Method 500 also includes operation 504, where a document depicted in the video data is captured. Preferably, the document is a "long document" as defined herein.

Method 500 further includes operation 506, where a position of the detected document is tracked throughout the video data. As recited above, "throughout" should be understood to include both temporal and data-based measures. In other words, tracking a document "throughout" video data may include tracking the document in each portion of the entirety of the video data (even if performed over a course of several discontinuous spans of time) and/or tracking the document during an entire duration of the time during which video data are captured.

Method 500 still further includes operation 508, where a plurality of images, each depicting a portion of the document, are selected using the image capture component. The selection is based in whole or in part on the tracked document position and the estimated motion vectors.

Method 500 also includes operation 510, where a composite image is generated based on at least some of the selected images.

In various embodiments, the method 500 may be performed exclusively using a mobile device, or parts of the method may be performed using the mobile device and other parts may be performed using other resources such as a workstation or network server. Preferably, where the method is performed across multiple devices, at least the capturing, the detecting, the tracking.

In various approaches, the presently disclosed long document capture and processing techniques may be embodied as a computer program product, which may have any or all of the features described herein.

For example, in one embodiment, a computer program product may include a computer readable medium having stored thereon computer readable instructions effective to cause a computing device, upon execution thereof, to perform a method, e.g. method 500 as represented in FIG. 5 and discussed above. Preferably, the computing device is a mobile device, but in alternative approaches the computing device may include any combination of devices such as a mobile device, a computer workstation, a network server, etc. as would be understood by one having ordinary skill in the art upon reading the present descriptions. However, it is also to be understood that the inventive embodiments disclosed herein are specially configured to enable operation of mobile devices in the context of long document capture techniques, which are otherwise not possible using conventional mobile devices and image processing approaches.

The computer program product may further include instructions configured to cause the mobile device to store at least some of the selected images to a memory of the mobile device in response to selecting the images.

With respect to tracking, in preferred embodiments the tracking functionality is based exclusively on the estimated plurality of motion vectors. In additional approaches, the tracking functionality may be based on textual information and/or document features instead of, or in addition to, the plurality of motion vectors.

The computer program product may additionally and/or alternatively include instructions configured to cause the mobile device to: determine at least one motion displacement based on some or all of the estimated plurality of motion vectors, each motion displacement corresponding to the image capture component during the capture operation; and terminate the capture operation in response to determining one of the motion displacements) is characterized by a value exceeding a predefined motion displacement threshold.

The predefined motion displacement threshold may have a value in a range from about 25 microns to about 50 microns, from about 30 microns to about 45 microns, from about 35 microns to about 40 microns, or a value of about 37.5 microns, in various approaches. In other approaches, the motion displacement threshold may have a value measured in pixels, and be in a range from about 5 pixels to about 25 pixels, about 10 pixels to about 20 pixels, about 5 pixels to about 10 pixels, 5 pixels, or any value in these ranges.

In more approaches, the instructions configured to cause the mobile device to detect the document may additionally and/or alternatively include instructions configured to cause the mobile device to identify at least one edge of the document depicted in the captured video data.

Preferably, each of the selected plurality of images depicts a portion of the document, and the composite image depicts an entirety of the document. However, in additional embodiments the composite image may depict only portions of the document, e.g. portions that are relevant to a downstream processing operation or particular transaction to which the document relates. Similarly, in even more approaches a portion of the document that satisfies quality control criteria or other prerequisite criteria (e.g. image format, image resolution, image size, etc.) may be represented in the composite image, while other portions not satisfying one or more of the quality control (or other prerequisite) criteria may be omitted from the composite image.

The composite image may also be characterized by at least one of: an image resolution greater than an image resolution of any of the selected plurality of images; and an image size greater than an image size of any of the selected plurality of images. For example, the composite image may have a length approximately equal to a sum of lengths of the plurality of images from which the composite image was generated.

In other embodiments, the composite image may have a length approximately equal to a sum of lengths of the plurality of images from which the composite image was generated, but discounting an amount of overlap between the plurality of images from which the composite image was generated. For instance, if an overlap of approximately one half (50%) is utilized as a threshold overlap, then the length of the composite image may be approximately equal to two-thirds the sum of the lengths of the plurality of images from which the composite image was generated. Similarly, if the overlap threshold is approximately one third (33%), then the length of the composite image may be approximately equal to four-fifths the sum of the lengths of the plurality of images from which the composite image was generated.

Most preferably, each selected image depicts a portion of the document, and the composite image depicts only portion(s) of the document that correspond to a business event (e.g. financial transaction, contract formation) memorialized by the document.

In additional embodiments, the computer program product may further include instructions configured to cause the mobile device to: identify, based on the composite image, one or more portions of the document depicting textual information; classify each identified portion of the document based on the textual information depicted therein; determine whether each classified portion is relevant to the financial transaction or irrelevant to the financial transaction, the determining being based on the portion classification; and remove each portion determined to be irrelevant to the financial transaction from the composite image.

The computer program product may even further comprise instructions configured to cause the mobile device to: align the portions determined to be relevant to the financial transaction; and generate a second composite image, wherein the second composite image is characterized by: approximately a same image size as an image size of the composite image; approximately a same image resolution as an image resolution of the composite image; excluding textual information irrelevant to the financial transaction; and including textual information relevant to the financial transaction.

Preferably, a plurality of characters comprising the textual information relevant to the financial transaction are aligned with one another, so that all textual information depicted in the composite image is substantially aligned along a single orientation or angle, as is the case with a single image of a document (assuming all textual information is similarly aligned within the physical document itself).

In several approaches, the instructions configured to cause the mobile device to select the plurality of images may include instructions configured to cause the mobile device to define a plurality of frame pairs. Each frame pair may consist of a reference frame and a test frame, while each reference frame and each test frame is selected from the video data.

The instructions configured to cause the mobile device to select the plurality of images may additionally and/or alternatively include instructions configured to cause the mobile device to: determine an amount of overlap between the reference frame and the test frame of each frame pair; and select an image corresponding to each frame pair for which the amount of overlap between the reference frame and the test frame is greater than a predetermined overlap threshold.

Preferably, the amount of overlap corresponds to the document, as opposed to background textures depicted in the test frame and/or the reference frame. As will be appreciated by those having ordinary skill in the art, alignment based on background textures (or even including background textures, but not necessarily based thereon) have an undesirable tendency to generate false-positive alignment results with respect to the document (or indeed, any other object depicted in the image).

Even more preferably, in various embodiments the predetermined overlap threshold corresponds to a distance of at least 50%, at least 40%, at least 33%, or at least 25% of a length of the reference frame. In other approaches, the overlap threshold may be defined with respect to the length of the document, as opposed to the length of the portion(s) of the document depicted in a particular reference frame or reference frames.

The instructions configured to cause the mobile device to generate the composite image, in multiple embodiments, further comprise instructions configured to cause the mobile device to: detect textual information in each of the reference frame and the test frame of at least one frame pair. The textual information is depicted in the document, as opposed to textual information that may appear in the image background.

In additional approaches, the instructions configured to cause the mobile device to detect textual information in the reference frame(s) and the test frame(s) include instructions configured to cause the mobile device to: define, in the reference frame, at least one rectangular portion of the document depicting some or all of the textual information; define, in the test frame, at least one corresponding rectangular portion of the document depicting some or all of the textual information; and align the document depicted in the test frame with the document depicted in the reference frame. Put another way, alignment operates such that the test frame is aligned with the reference frame, using the document (as opposed, for example, to frame edges or background textures) as the point of reference for the alignment.

In various embodiments, the alignment may be based on one or more of the following: textual information, document features, document edges, etc. as would be understood by one having ordinary skill in the art upon reading the present descriptions.

In preferred approaches, the textual information comprises at least one of: an identity of one or more characters represented in the rectangular portion; an identity of one or more characters represented in the corresponding rectangular portion; a sequence of characters represented in the rectangular portion; a sequence of characters represented in the corresponding rectangular portion; a position of one or more characters represented in the rectangular portion; a position of one or more characters represented in the corresponding rectangular portion; an absolute size of one or more characters represented in the rectangular portion; an absolute size of one or more characters represented in the corresponding rectangular portion a size of one or more characters represented in the rectangular portion relative to a size of one or more characters represented in the corresponding rectangular portion; a size of one or more characters represented in the corresponding rectangular portion relative to a size of one or more characters represented in the rectangular portion; a color of one or more characters represented in the rectangular portion; a color of one or more characters represented in the corresponding rectangular portion; a shape of one or more characters represented in the rectangular portion; and a shape of one or more characters represented in the corresponding rectangular portion.

In even more approaches, the instructions configured to cause the mobile device to align the document depicted in the test frame with the document depicted in the reference frame include instructions configured to cause the mobile device to perform optical character recognition (OCR) on at least the rectangular portion and the corresponding rectangular portion. In these approaches, alignment may be preferably performed utilizing character location and character identity as primary points of reference.

Furthermore, the instructions configured to cause the mobile device to generate the composite image may further comprise instructions configured to cause the mobile device to: detect a skew angle (e.g. $\theta$ as depicted in FIGS. 4A-4C) in one or more of the reference frame and the test frame of at least one of the frame pairs, the skew angle corresponding to the document and having a magnitude of >0.0 degrees (as depicted in FIG. 4B); and correct the skew angle in at least one of the reference frame and the test frame. The document depicted in the composite image is characterized by a skew angle of approximately 0.0 degrees (e.g. as depicted in FIG. 3).

The computer program product may further include instructions configured to cause the mobile device to downsample the video data, e.g. by a factor of 5, and the instructions configured to cause the mobile device to detect the document, track the position of the document, and select the plurality of images is configured to perform the detecting, the tracking, and the selecting using the downsampled video data.

The preceding descriptions elaborate upon several features involved in the presently disclosed long document capture and processing techniques. The additional details should be understood as capable of being combined in any suitable manner that would be appreciated by one having ordinary skill in the art upon reading the present descriptions. Any synthesis, combination, permutation, etc. of the features disclosed herein may be included or excluded from various embodiments without departing from the scope of the present disclosure.

Classification and Extraction Implementations

Figure 6:
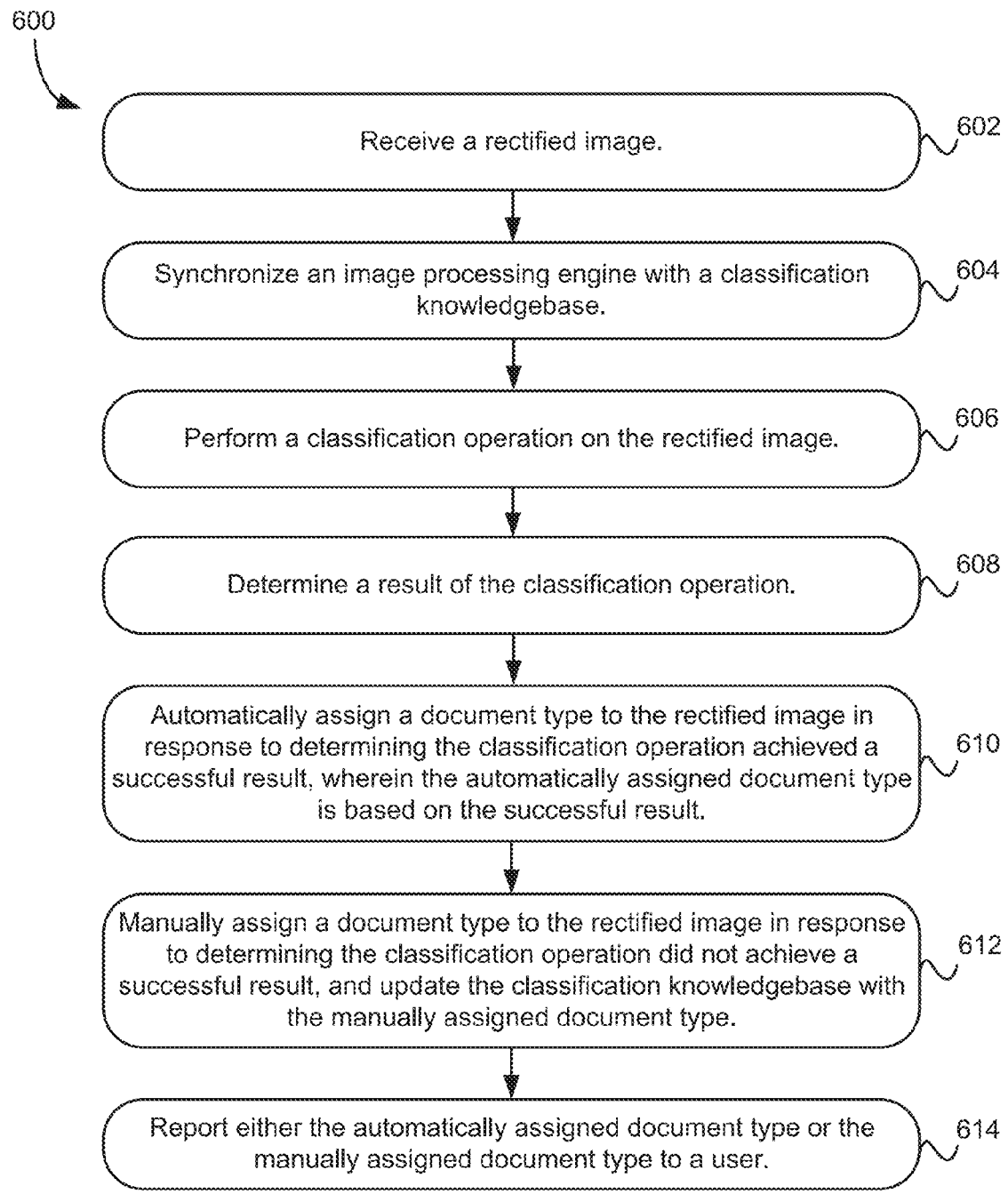
FIG. 6 is a flowchart of a method, according to one embodiment.

In one approach, for example, document classification may be performed in a manner substantially similar to the flow diagram 600 shown in FIG. 6. Of course, the flow diagram is presented merely by way of example to facilitate understanding of the inventive concepts disclosed herein, and is not intended to be limiting on the scope of the present application.

In one approach, document classification may proceed as follows. In operation 602, a rectified image is received, preferably at a mobile device.

In operation 604, an image processing engine, e.g. a processor of a mobile device or server, synchronizes with a classification knowledgebase. The classification knowledgebase may preferably include a plurality of predefined document classes, defined according to unique features thereof, e.g. via a feature vector and/or plurality of reference feature matrices, as disclosed in related U.S. patent application Ser. No. 13/802,226.

In operation 606, classification is performed on the rectified image using the classification knowledgebase.

In operation 608, a result of the classification operation, e.g., success or failure, is determined.

In operation 610, in response to determining classification was successful, a document type is automatically assigned to the rectified image. The automatically assigned document type is based on the successful classification result.

In operation 612, on the other hand, and in response to determining the classification operation result was failure, a document type is manually assigned to the rectified image. Moreover, the classification knowledgebase is preferably updated with the manually assigned document type so that in future situations where similar documents are presented in the rectified image, it will be possible to automatically assign the corresponding document type based on the expanded classification knowledge base, e.g., similar to as described above with reference to operation 610.

In operation 614, either the automatically assigned document type or the manually assigned document type is reported, preferably to a user or via being displayed on a display of the mobile device.

In additional approaches, it is advantageous to utilize image classification techniques, which present unique challenges in the context of long document capture and processing, since many long documents (e.g. receipts) are not standard forms of a given size, and the features shown on a particular long document can change position with respect to other types of long document. In such scenarios, it is useful to divide the receipt into several portions (e.g. similar as described above with respect to test and reference frames, and particularly with respect to text block matching), and classify each portion. Based on the classification determined for each portion, an overall document classification may be determined, e.g. in preferred approaches each portion is determined to belong to a same particular classification, which is thus determined to be the classification of the entire document. Of course, in practical applications 100% agreement is rare, so and the most frequently determined class among the various portion classifications may be utilized as the document classification.

Figure 7:
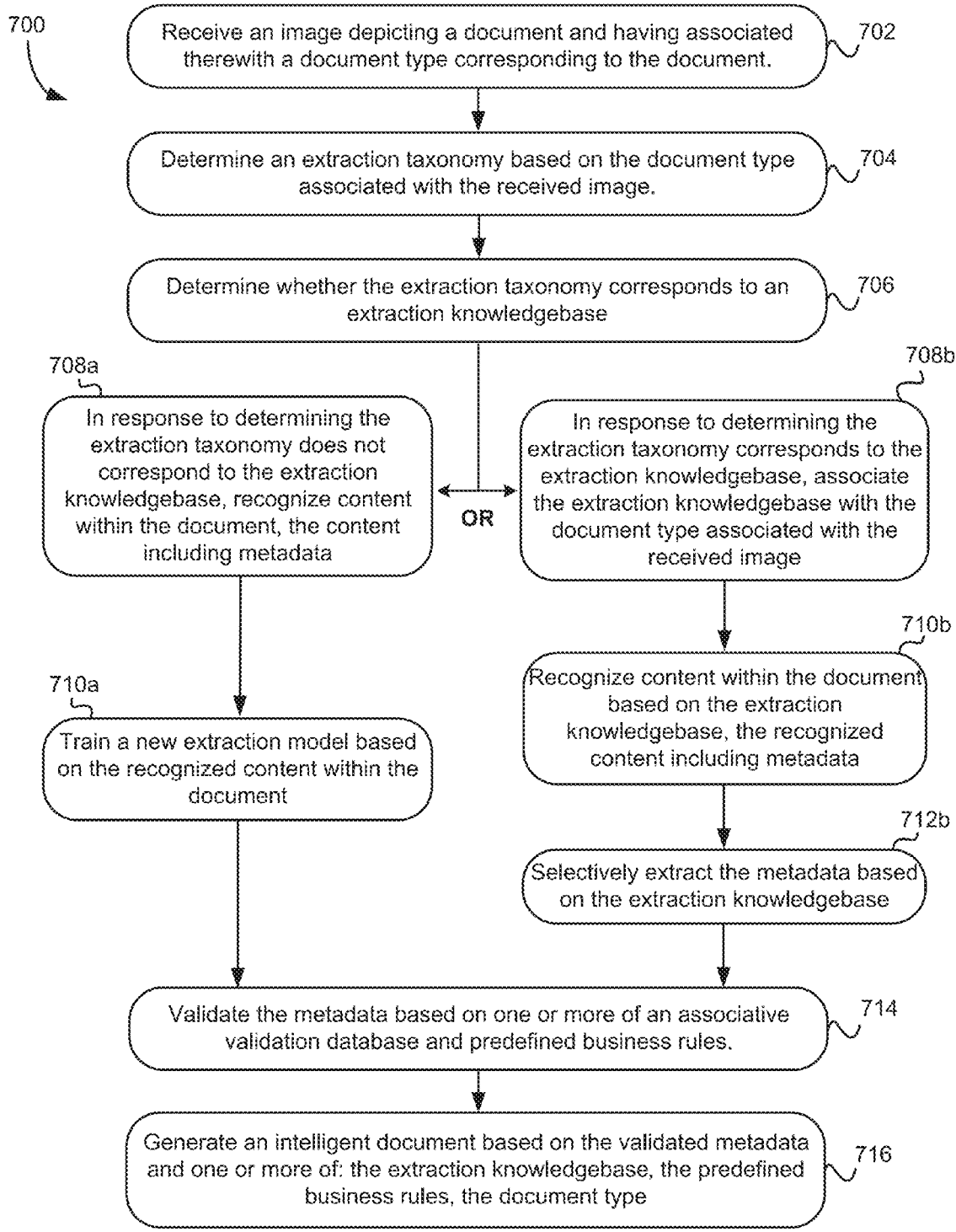
FIG. 7 is a flowchart of a method, according to one embodiment.

Similarly, extraction may be performed in a manner substantially similar to the flow diagram 700 shown in FIG. 7. Again, the flow diagram is not to be considered limiting in any way, but merely an illustrative example of one embodiment of the presently described inventive concepts.

In operation 702, an image depicting a document, and having associated therewith a document type corresponding to the document, is received (preferably at a mobile device).

In operation 704, an extraction taxonomy is determined based on the document type.

In operation 706, it is determined whether the extraction taxonomy corresponds to an extraction knowledgebase.

In operation 708a, if the extraction taxononmy does not correspond to the extraction knowledgebase, content is recognized within the document (e.g. using OCR). The recognized content includes metadata.

In operation 710a, a new extraction model is trained based on the recognized content. If the extraction taxonomy does not correspond to the extraction knowledgebase, the method 700 proceeds to operation 714.

On the other hand, in operation 708b, if the extraction taxonomy corresponds to an extraction knowledgebase, the extraction knowledgebase is associated with the document type.

In operation 710b, content is recognized within the document, the recognition being based at least in part on the extraction knowledgebase, and the recognized content including metadata.

In operation 712b, the metadata are selectively extracted based on the extraction knowledgebase.

In operation 714, the metadata are validated based on one or more of associative validation information in an associative validation database, and predefined business rules.

In operation 716, an intelligent document (preferably a PDF) is generated based on the validated metadata and one or more of the extraction knowledgebase, the predefined business rules, and the document type.

In more approaches, the presently disclosed methods, systems, and/or computer program products may be utilized with, implemented in, and/or include one or more user interfaces configured to facilitate performing any functionality disclosed herein and/or in the aforementioned related Patent Application, such as an image processing mobile application, a case management application, and/or a classification application, in multiple embodiments.

In still more approaches, the presently disclosed systems, methods and/or computer program products may be advantageously applied to one or more of the use methodologies and/or scenarios disclosed in the aforementioned related Patent Application, among others that would be appreciated by one having ordinary skill in the art upon reading these descriptions.

It will further be appreciated that embodiments presented herein may be provided in the form of a service deployed on behalf of a customer to offer service on demand.

Exemplary Use Cases

Bill Pay

One major challenge in Bill-Pay scenarios (and for other applications involving mobile capture) is taking a high quality picture of the source document, e.g. invoice, packing slip, remittance slip, etc. Preferably, the document should fill the viewfinder to a large degree, with no clipped corners or edges. The document should also preferably be adequately lighted, in focus, and taken at an angle with relatively small deviations from normal (e.g. the imaging device being oriented in a plane substantially parallel the document) to minimize distortions. It should also have good background separation, and a uniform background with respect to texture, color, and/or illumination, etc. The use cases and development areas described below outline useful applications for technology that can assist a user in achieving these goals.

Automatic Capture Quality Assistance

When a user submits a document, such as a bill for payment, the automatic capture should preferably only take a picture when a document is truly positioned in the viewfinder, a situation which may be verified by the imaging device using various techniques.

For example, in one embodiment the imaging device (e.g. mobile phone) may preprocess the video feed to detect a single document in the video frame. In one exemplary approach, preprocessing involves finding features of a document page (e.g. edges or areas of similar color) and some reasoning about what set of features constitutes a document. In various implementations of this technology, it is possible to use a function such as an "opencv function" to find regions within an image that have been preprocessed using filters such as a Laplacian filter or other similar filter as would be understood by one having ordinary skill in the art upon reading the present descriptions.

Using such filters, it is possible to provide an indication to the application software when the document is completely within the viewfinder. Also, in preferred embodiments it is possible to measure the stability of the device (e.g. using integrated device components such as the accelerometer) and the angle of the device, e.g. relative to a horizontal surface upon which the document is placed (e.g. using integrated device components such as the gyroscope). Accordingly, preferred embodiments are capable of initiating the capture process for picture-taking only when one or more, and preferably all three, quality measures are met.

Stability in Detection

In some approaches, the indicator of the detected document may be unstable, e.g. move around too much to capture a desirably clear image or verify the located document in the video preview. As a result, it is desirable to have more stable document detection in the video preview.

In one approach, stability may be enhanced by utilizing a procedure where, instead of detecting a single document in a single video frame, a multi-frame approach would be to average the movement of detected edges over a window of time, thereby avoiding rapid movement of the document hypothesis.

Complex Backgrounds

In various instances, it is advantageous for a document having a predominantly light-toned background (e.g. a white background with black text printed thereon) to be imaged in front of a relatively dark background. Unfortunately, in many cases a user may not have convenient access to a dark, uniformly colored surface. Accordingly, it is favorable for the user to be enabled to take the picture of the document on surfaces with more heterogeneous texture.

Evaluate Lighting Conditions

Ideally, capture device image capture components should automatically evaluate ambient light conditions and optimize capture settings to ensure adequate exposure. However, the light sensor is not directly accessible in some devices. In some approaches, it is possible to overcome this limitation by using the back and front image capture components as indirect light sensors.

In one embodiment it is possible to evaluate lighting using only the back image capture component (i.e. the one that is eventually taking the picture). The device can evaluate the brightness distribution of a video frame and take a picture only if that distribution matches situations previously found or otherwise known to lead to good exposure.

In another embodiment, it is possible to evaluate lighting conditions by taking two pictures automatically, one with flash, and one without, and analyzing which one gives the better exposure. It is also possible to mix the two images (flash and no-flash), particularly when captured in short succession (e.g. within less than one second of one another, which may be accomplished utilizing features such as "burst mode" capture and HDR imagery).

In more embodiments, it is possible to use a mobile device light, e.g. an LED such as a video lamp (torch, flashlight, etc.) to find the best possible capture conditions. The lighting level of the light can be adjusted, so the device could ramp up the light, take frames along the way, analyze which one gives the best exposure, and take a high quality exposure with that setting. Good exposure may be indicated by any of the exemplary quality measures described above.

In still more embodiments, the device may take pictures from both image capture components (back and front) and analyze the brightness distribution for both. This approach preferably reveals situations where the main light source is behind the image capture component, e.g. where an image capture component casts a shadow on the document, etc., and the user may be directed to move to a new location and re-evaluate the brightness distribution for better capture conditions.

For example, the brightness setting of the screen of the device might be accessible through the device's resident operating system (OS) application programming interface (API). In such cases, the brightness setting should preferably be correlated to the amount of light hitting the device (e.g. as may be measured according to an amount of light entering one or more image capture components of the mobile device), although not necessarily the amount of light hitting the document surface. This correlation allows the device and/or software application to get a sense of the ambient light present.

Avoid Glare

As will be appreciated by skilled artisans reading the instant disclosures, it may be advantageous apply the presently techniques to situations where glare presents an additional challenge, e.g. where a user wants to take a picture of a glossy document, such as a driver's license, a gift card, a credit card, etc. However, when the user attempts to take the picture, there is glare due to the reflections, and/or any embedded hologram may show through the surface of the document. Preferable embodiments of the presently disclosed techniques and products convey abilities to avoid glare in glossy documents.

For example, in one approach it is preferable if pictures of documents with reflective surfaces or embedded holograms are taken at a slight angle. The presently disclosed techniques may therefore utilize sample frames, e.g. to detect potential glare. It also is advantageous in some approaches to use the detected document within the frame to estimate the current angle of the image capture component to the document (i.e., independent of information that may be provided by other components of the mobile device to determine mobile device orientation, such as an accelerometer, compass, gyroscope, etc. as would be understood by one having ordinary skill in the art upon reading the present descriptions). In this embodiment, the user is provided directions to then guide the user to take a picture at a slight angle to the document, e.g. an angle of about 5 degrees 10 degrees, or 15 degrees deviation from normal, with respect to the predominant planar orientation of the document.

Show the Document in Detail

In several approaches, a user may desire to review a document being captured in detail, while aligning the image capture component of the mobile device with the document. To accomplish this result, the present techniques may utilized a combined deskew and cropping approach, wherein (optionally in response to detecting presence of a complete document depicted within the field of view of the image capture component), a frame is captured, and the frame is cropped and straightened, and the resulting document is shown in full size within the viewfinder.

Indicate the Document Category

When a user frames an image of a document, in some instances it may be advantageous to indicate what category the document is, thereby making more certain that the capture and/or downstream processing will be successful.

When a document has been found, the presently disclosed techniques may include cropping and straightening the document as described above, followed by performing a classification operation. The success of classification operation may be visually indicated, e.g. with a green overlay over the document, and potentially the category is output to the device display, to memory, to a downstream processing application, library function, call, etc.

Capture Multiple Documents, One at a Time

In some instances, it is advantageous to be able to capture two (or more) documents laid out on a surface such as a desk. A user may want to move the image capture component slowly over the documents, have the image capture component automatically detect each, and capture images of each, all without necessarily taking a picture of the same document twice.

In addition to finding a document in a frame, this use case benefits significantly from the ability to track documents. Tracking allows the system to take an image of the first document, keep tracking it, but not taking another picture of it. As soon as the second document comes into view, the system switches to that document and starts tracking it. When it is in full view, a picture will be taken. Document tracking may be performed substantially as described above with respect to long document capture, in preferred embodiments.

Capture Multiple Documents at the Same Time

In more complex situations, a user may need to capture two (or more) documents laid out on a surface such as a desk, and sometimes the documents may be positioned in close proximity to each other, presenting an additional challenge to distinguishing between the two documents. In order to address this challenge, the presently disclosed techniques may direct the user to move the image capture component slowly over the documents and so that the image capture component automatically detects each document and captures an image or images of the documents, without taking a picture of the same document twice. For example, the mobile device may provide auditory instructions to the user indicating a preferred direction of motion.

Preferably, the techniques track multiple documents in a single frame. However, it is also within the scope of the present disclosures to track the movement of plural documents over multiple frames. In some implementations, it is preferable to take multiple images and keep only a selected portion of the multiple captured images, e.g. for tracking. From the selected portion, the multiple-document capture algorithms isolate the individual documents that are shown (winch might be all of the documents or only some of the documents), and determine which image of each document is the best one. Document tracking may be performed substantially as described above with respect to long document capture, in preferred embodiments.

Capture and Track Multiple Documents

Additional applications include capturing multiple documents and tracking those documents in real or near-real time. In such approaches, while the user is hovering the capture device over the documents, the user is preferably provided an indication of what each document is (e.g. document classification) and further indicates which of the documents have been captured in an image as described above.

For instance, within the viewfinder, one could mark each document that has been processed with an overlay (yellow for detected and desired category, green for captured document, and gray for undesired category).

In another instance, imagine a scene where a user starts with a high-level overview of their desk. The system detects five documents and is able to classify them. Four of them are relevant to the user's particular use for the documents (e.g. are relevant to a particular transaction, or are suitable for downstream processing, etc.), and are colored yellow. The irrelevant document is colored gray.

Further, suppose the resolution of images captured (or images that would be captured from the current position where the image capture component is located) and depicting the four relevant documents is not high enough to allow good quality images of all four desired documents. For example, the user (and by extension the image capture component of the mobile device) may be too far away from three of the four documents, such that only one document is close enough to allow for a sufficiently high resolution. The system takes a picture, isolates that document, and performs one or more quality assurance checks (e.g. for image clarity, brightness, etc.), and marks the document with a green overlay in response to determining the quality assurance checks are passed. The user then moves the image capture component to have another document appear bigger in the viewfinder. The system tracks all documents, and snaps another picture of the document that is now in better view. The image of that document is isolated and checked, and marked with a green overlay. Similarly, the other documents are captured.

During this procedure, some of the documents already detected and processed might disappear from the view (the user zooms in on one particular document, and the others are not in view). When the user goes back to the bigger picture, the system has to recognize those documents as already having been processed. Therefore, in at least some instances it would be advantageous to perform a "scene analysis" wherein the position of documents relative to each other is recorded and analyzed.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer program product comprising a non-transitory computer readable medium having stored thereon instructions executable by a mobile device, the instructions being configured to cause the mobile device, upon execution thereof, to:
   initiate a capture operation using an image capture component of the mobile device, the capture operation comprising;
      capturing video data; and
      estimating a plurality of motion vectors corresponding to motion of the image capture component during the capture operation;
   detect a document depicted in the video data;
   track a position of the detected document throughout the video data;
   select a plurality of images using the image capture component of the mobile device, wherein the selection is based at least in part on:
      the tracked position of the detected document; and
      the estimated motion vectors; and
   generate a composite image based on at least some of the selected plurality of images.

2. The computer program product as recited in claim 1, wherein the document is a long document.

3. The computer program product as recited in claim 1, wherein the tracking is based exclusively on the estimated plurality of motion vectors.

4. The computer program product as recited in claim 1, the instructions configured to cause the mobile device to detect the document further comprising instructions configured to cause the mobile device to identify at least one edge of the document depicted in the captured video data.

5. The computer program product as recited in claim 1, wherein each of the selected plurality of images depicts a portion of the document, and wherein the composite image depicts an entirety of the document.

6. The computer program product as recited in claim 1, wherein the composite image is characterized by at least one of:
   an image resolution greater than an image resolution of any of the selected plurality of images; and
   an image size greater than an image size of any of the selected plurality of images.

7. The computer program product as recited in claim 1, further comprising instructions configured to cause the mobile device to downsample the video data, and
   wherein the instructions configured to cause the mobile device to detect the document, track the position of the document, and select the plurality of images is configured to perform the detecting, the tracking, and the selecting using the downsampled video data.

8. The computer program product as recited in claim 1, further comprising instructions configured to cause the mobile device to:

determine at least one motion displacement based on some or all of the estimated plurality of motion vectors, each motion displacement corresponding to the image capture component during the capture operation; and either terminate or pause the capture operation in response to determining one of the motion displacement(s) is characterized by a value exceeding a predefined motion displacement threshold; and either initiate a new capture operation in response to terminating the capture operation; or resume the capture operation in response to pausing the capture operation.

9. The computer program product as recited in claim 8, wherein the predefined motion displacement threshold has a value in a range from about 5 pixels to about 25 pixels.

10. The computer program product as recited in claim 1, wherein each selected image depicts a portion of the document, and wherein the composite image depicts only portion(s) of the document that correspond to a financial transaction memorialized by the document.

11. The computer program product as recited in claim 10, further comprising instructions configured to cause the mobile device to:

identify, based on the composite image, one or more portions of the document depicting textual information;

classify each identified portion of the document based on the textual information depicted therein; determine whether each classified portion is relevant to the financial transaction or irrelevant to the financial transaction, the determining being based on the portion classification; and remove each portion determined to be irrelevant to the financial transaction from the composite image.

12. The computer program product as recited in claim 11, further comprising instructions configured to cause the mobile device to:

align the portions determined to be relevant to the financial transaction; and generate a second composite image, wherein the second composite image is characterized by:

approximately a same image size as an image size of the composite image;

approximately a same image resolution as an image resolution of the composite image;

excluding textual information irrelevant to the financial transaction; and including textual information relevant to the financial transaction, wherein a plurality of characters comprising the textual information relevant to the financial transaction are aligned.

13. The computer program product as recited in claim 1, the instructions configured to cause the mobile device to select the plurality of images further comprising instructions configured to cause the mobile device to define a plurality of frame pairs, wherein each frame pair consists of a reference frame and a test frame, and wherein each reference frame and each test frame is selected from the video data.

14. The computer program product as recited in claim 13, the instructions configured to cause the mobile device to generate the composite image further comprising instructions configured to cause the mobile device to:

detect a skew angle in one or more of the reference frame and the test frame of at least one of the frame pairs, the skew angle corresponding to the document and having a magnitude of >0.0 degrees; and correct the skew angle in at least one of the reference frame and the test frame, wherein the document depicted in the composite image is characterized by a skew angle of approximately 0.0 degrees.

15. The computer program product as recited in claim 13, the instructions configured to cause the mobile device to select the plurality of images further comprising instructions configured to cause the mobile device to:

determine an amount of overlap between the reference frame and the test frame of each frame pair; and select an image corresponding to each frame pair for which the amount of overlap between the reference frame and the test frame is greater than a predetermined overlap threshold.

16. The computer program product as recited in claim 15, wherein the amount of overlap corresponds to the document, wherein the amount of overlap does not correspond to a background depicted in the reference frame, and wherein the amount of overlap does not correspond to a background depicted in the test frame.

17. The computer program product as recited in claim 15, wherein the predetermined overlap threshold corresponds to a distance of at least 40% of a length of the reference frame.

18. The computer program product as recited in claim 13, the instructions configured to cause the mobile device to generate the composite image further comprising instructions configured to cause the mobile device to:

detect textual information in each of the reference frame and the test frame of at least one frame pair, the textual information being depicted in the document.

19. The computer program product as recited in claim 18, the instructions configured to cause the mobile device to detect textual information in each of the reference frame and the test frame of at least one frame pair further comprising instructions configured to cause the mobile device to:

define, in the reference frame, at least one rectangular portion of the document depicting some or ail of the textual information;

define, in the test frame, at least one corresponding rectangular portion of the document depicting some or all of the textual information; and align the document depicted in the test frame with the document depicted in the reference frame, the alignment being based on:

the textual information depicted in at least one of the rectangular portion(s); and the textual information depicted in at least one of the corresponding rectangular portion(s).

20. The computer program product as recited in claim 19, wherein the textual information comprises at least one of:

an identity of one or more characters represented in the rectangular portion;

an identity of one or more characters represented in the corresponding rectangular portion;

a sequence of characters represented in the rectangular portion;

a sequence of characters represented in the corresponding rectangular portion;

a position of one or more characters represented in the rectangular portion;

a position of one or more characters represented in the corresponding rectangular portion;

an absolute size of one or more characters represented in the rectangular portion;

an absolute size of one or more characters represented in the corresponding rectangular portion a size of one or more characters represented in the rectangular portion relative to a size of one or more characters represented in the corresponding rectangular portion;

a size of one or more characters represented in the corresponding rectangular portion relative to a size of one or more characters represented in the rectangular portion;

a color of one or more characters represented in the rectangular portion;

a color of one or more characters represented in the corresponding rectangular portion;

a shape of one or more characters represented in the rectangular portion; and a shape of one or more characters represented in the corresponding rectangular portion.

21. The computer program product as recited in claim 19, the instructions configured to cause the mobile device to align the document depicted in the test frame with the document depicted in the reference frame further comprising instructions configured to cause the mobile device to perform optical character recognition (OCR) on at least the rectangular portion and the corresponding rectangular portion.

* * * * *